United States Patent
Kanno et al.

(10) Patent No.: US 9,557,597 B2
(45) Date of Patent: Jan. 31, 2017

(54) LIQUID CRYSTAL DISPLAY DEVICE, LIGHT CONTROL FILM, AND DISPLAY DEVICE

(71) Applicant: Sharp Kabushiki Kaisha, Osaka-shi, Osaka (JP)

(72) Inventors: Toru Kanno, Osaka (JP); Emi Yamamoto, Osaka (JP); Tsuyoshi Maeda, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/368,565

(22) PCT Filed: Dec. 25, 2012

(86) PCT No.: PCT/JP2012/083412
§ 371 (c)(1),
(2) Date: Jun. 25, 2014

(87) PCT Pub. No.: WO2013/099839
PCT Pub. Date: Jul. 4, 2013

(65) Prior Publication Data
US 2014/0354927 A1 Dec. 4, 2014

(30) Foreign Application Priority Data
Dec. 27, 2011 (JP) ................................ 2011-284848

(51) Int. Cl.
*G02F 1/1335* (2006.01)
*G02B 5/02* (2006.01)

(52) U.S. Cl.
CPC ........... *G02F 1/133504* (2013.01); *G02B 5/02* (2013.01); *G02B 5/0257* (2013.01)

(58) Field of Classification Search
CPC .... G02F 1/133504; G02B 5/02; G02B 5/0257
(Continued)

(56) References Cited

U.S. PATENT DOCUMENTS

| | | |
|---|---|---|
| 6,417,966 B1 | 7/2002 | Moshrefzadeh et al. |
| 2002/0080484 A1 | 6/2002 | Moshrefzadeh et al. |

(Continued)

FOREIGN PATENT DOCUMENTS

| | | |
|---|---|---|
| JP | 2003-504691 A | 2/2003 |
| JP | 2004-516525 A | 6/2004 |

(Continued)

OTHER PUBLICATIONS

Official Communication issued in International Patent Application No. PCT/JP2012/083412, mailed on Feb. 12, 2013.

*Primary Examiner* — Charles Chang
(74) *Attorney, Agent, or Firm* — Keating & Bennett, LLP

(57) ABSTRACT

In a liquid crystal display device including a light control film utilizing total reflection, a liquid crystal panel, and a directional backlight, the light control film includes a transparent base material, a light blocking layer, and a light diffusing portion. The light diffusing portion has a light output end surface on side closer to the transparent base material and a light input end surface on side opposite to the transparent base material, the light input end surface having a larger area than the light output end surface. A film thickness of the light diffusing portion is larger than a thickness of the light blocking layer. A material having a smaller refractive index than the light diffusing portion is present in a cavity defined by the light diffusing portion, and the film anisotropically diffuses light.

15 Claims, 17 Drawing Sheets

(58) Field of Classification Search
USPC .......................................................... 349/112
See application file for complete search history.

(56) References Cited

U.S. PATENT DOCUMENTS

| | | | | |
|---|---|---|---|---|
| 2002/0167725 | A1* | 11/2002 | Goto | G03B 21/625 |
| | | | | 359/456 |
| 2005/0128579 | A1* | 6/2005 | Thomas | B29C 70/745 |
| | | | | 359/443 |
| 2008/0252963 | A1* | 10/2008 | Lee | G02B 5/208 |
| | | | | 359/350 |
| 2012/0075547 | A1 | 3/2012 | Aoyama et al. | |
| 2012/0268826 | A1* | 10/2012 | Umeda | G02B 5/0231 |
| | | | | 359/599 |

FOREIGN PATENT DOCUMENTS

| | | |
|---|---|---|
| JP | 2007-071916 A | 3/2007 |
| JP | 2010-256869 A | 11/2010 |
| WO | 2010/143335 A1 | 12/2010 |

* cited by examiner

LIQUID CRYSTAL DISPLAY DEVICE, LIGHT CONTROL FILM, AND DISPLAY DEVICE

TECHNICAL FIELD

The present invention relates to a liquid crystal display device, a light control film, and a display device.

The present application claims priority based on Japanese Patent Application No. 2011-284848 filed in the Japan Patent Office on Dec. 27, 2011, the entire content of which is incorporated herein by reference.

BACKGROUND ART

Liquid crystal display devices are widely used as displays in portable electronic devices, e.g., cellular phones, televisions, and personal computers. It is generally known so far that the liquid crystal display device has good viewability when looked at from the front, but its viewing angle is narrow. According to one of various ideas for widening the viewing angle, a member (hereinafter referred to as a "light diffusing member") diffusing light output from a display body, e.g., a liquid crystal panel, is disposed on the viewing side of the display body.

For example, the light diffusing member is constituted to provide not only a light diffusion characteristic with dependency on an incidence angle such that light input at an angle within a particular angle range is diffused at higher intensity than light input at an angle outside the particular angle range, but also a light diffusion angle range with dependency on an azimuth angle, thus giving the light diffusion characteristic with three-dimensional anisotropy (see PTL 1).

Even in the case of the light diffusion characteristic being given with anisotropy, however, when light blocking portions are not present in hollow spaces provided by cavities between light diffusing portions, there is a risk that contrast may be reduced due to outside light. Furthermore, when a polarizing plate is disposed on an outermost surface of the light diffusing member to suppress reflection of the outside light, a utilization rate of light may lower.

CITATION LIST

Patent Literature

PTL 1: Japanese Unexamined Patent Application Publication No. 2007-71916

SUMMARY OF INVENTION

Technical Problems

The present invention has been made in view of the above-described problems, and an object of the present invention is to provide a liquid crystal display device, a light control film, and a display device, which can suppress reflection of outside light, and which can enhance an effect of increasing a viewing angle from a particular azimuth.

Solution to Problem

To solve the above-described problems, according to a preferred embodiment of the present invention, there is provided a liquid crystal display device comprising a light source, a liquid crystal panel that modulates light emitted from the light source, and an optical control film that is arranged on side closer to a viewing person than the liquid crystal panel, and that utilizes total reflection, wherein the light control film includes a transparent base material, a light blocking layer, and a light diffusing portion, a film thickness of the light diffusing portion is larger than a thickness of the light blocking layer, and the light diffusing portion has a light output end surface on side closer to the transparent base material and a light input end surface on side opposite to the transparent base material, the light input end surface having a larger area than the light output end surface, the film including a lower refractive-index material that has a lower refractive index than the light diffusing portion, and that is present in a cavity defined by the light diffusing portion, the film anisotropically diffusing light.

To solve the above-described problems, according to a preferred embodiment of the present invention, there is provided an optical control film comprising a base material having optical transparency, a plurality of light blocking layers formed on one surface of the base material in a scattered state, and a light diffusing portion formed on the one surface of the base material in a remaining region other than regions where the light blocking portions are formed, wherein a film thickness of the light diffusing portion is larger than a thickness of the light blocking layer, the light diffusing portion has a light output end surface on side closer to the base material and a light input end surface on side opposite to the base material, the light input end surface having a larger area than the light output end surface, and a lower refractive-index material having a lower refractive index than the light diffusing portion is present in a cavity defined in the light diffusing portion.

According to a preferred embodiment of the present invention, in the optical control film, a plan shape of the light blocking layer when viewed from a direction normal to the one surface of the transparent base material is an anisotropic shape having at least a long axis and a short axis.

According to a preferred embodiment of the present invention, in the optical control film, a plan shape of the light blocking layer when viewed from a direction normal to the one surface of the transparent base material includes an isotropic shape and an anisotropic shape together.

According to a preferred embodiment of the present invention, in the optical control film, a plan shape of the light blocking layer when viewed from a direction normal to the one surface of the transparent base material is polygonal.

According to a preferred embodiment of the present invention, in the optical control film, a plan shape of the light blocking layer when viewed from a direction normal to the one surface of the transparent base material is a shape including a curved line and a linear line.

To solve the above-described problems, according to a preferred embodiment of the present invention, there is provided an optical control film comprising a base material having optical transparency, a plurality of light diffusing portions formed on one surface of the base material, and a light blocking layer formed on the one surface of the base material in a remaining region other than regions where the light diffusing portions are formed, wherein a film thickness of the light diffusing portion is larger than a thickness of the light blocking layer, the light diffusing portion has a light output end surface on side closer to the base material and a light input end surface on side opposite to the base material, the light input end surface having a larger area than the light output end surface, and a lower refractive-index material having a lower refractive index than the light diffusing portion is present in a cavity between the light diffusing portions.

According to a preferred embodiment of the present invention, in the optical control film, a plan shape of the light diffusing portion when viewed from a direction normal to the one surface of the transparent base material is an anisotropic shape having at least a long axis and a short axis.

According to a preferred embodiment of the present invention, in the optical control film, a plan shape of the light diffusing portion when viewed from a direction normal to the one surface of the transparent base material includes an isotropic shape and an anisotropic shape together.

According to a preferred embodiment of the present invention, in the optical control film, a plan shape of the light diffusing portion when viewed from a direction normal to the one surface of the transparent base material is polygonal.

According to a preferred embodiment of the present invention, in the optical control film, a plan shape of the light diffusing portion when viewed from a direction normal to the one surface of the transparent base material is a shape including a curved line and a linear line.

According to a preferred embodiment of the present invention, in the optical control film, the cavity defined by the light diffusing portion is filled with air or inert gas, or is in a vacuum state.

According to a preferred embodiment of the present invention, in the optical control film, an optical diffusion layer including a light scatterer is disposed on one surface closer to viewing side than the light diffusing portion.

According to a preferred embodiment of the present invention, in the optical control film, the light blocking layer is made of a multilayered film including a black resin that contains at least one of light-absorbing pigment, light-absorbing dye and carbon black, a metal, or a metal oxide.

According to a preferred embodiment of the present invention, in the optical control film, an interface between the cavity defined by the light diffusing portion and the light diffusing portion is a slope in a curved shape in section, the slope having an inclination angle continuously changed.

According to a preferred embodiment of the present invention, in the optical control film, an interface between the cavity defined by the light diffusing portion and the light diffusing portion is a slope in a kinked-line shape in section, the slope having a plurality of inclination angles different from each other.

According to a preferred embodiment of the present invention, there is provided a display device employing the optical control film.

According to a preferred embodiment of the present invention, there is provided a liquid crystal display device employing the optical control film.

Advantageous Effects of Invention

According to the present invention, a liquid crystal display device providing a significant effect of increasing the viewing angle from a particular azimuth can be obtained by bonding, to the liquid crystal panel, the totally-reflecting light control film, which is constituted by the transparent base material, the light blocking portion, and the light diffusing layer disposed successively in the mentioned order from the side closer to a viewing person, thus suppressing reflection of outside light, and by forming the light control film utilizing total reflection as a structural body in which an opening in the light diffusing layer has an asymmetrical shape.

DESCRIPTION OF EMBODIMENTS

Embodiments of the present invention will be described below as examples for practicing the present invention with reference to the drawings, but the present invention is not limited to the following embodiments.

Regarding the following description with reference to the drawings, it is to be noted that the drawings are schematically represented and, for example, ratios between various sizes are different from those in actual cases. Components other than those necessary for explanation are omitted from the drawings, as appropriate, for easier understanding.

The illustrated embodiments are each described, by way of example, in connection with a liquid crystal display device including a transmissive liquid crystal panel as a display body.

Figure 1:
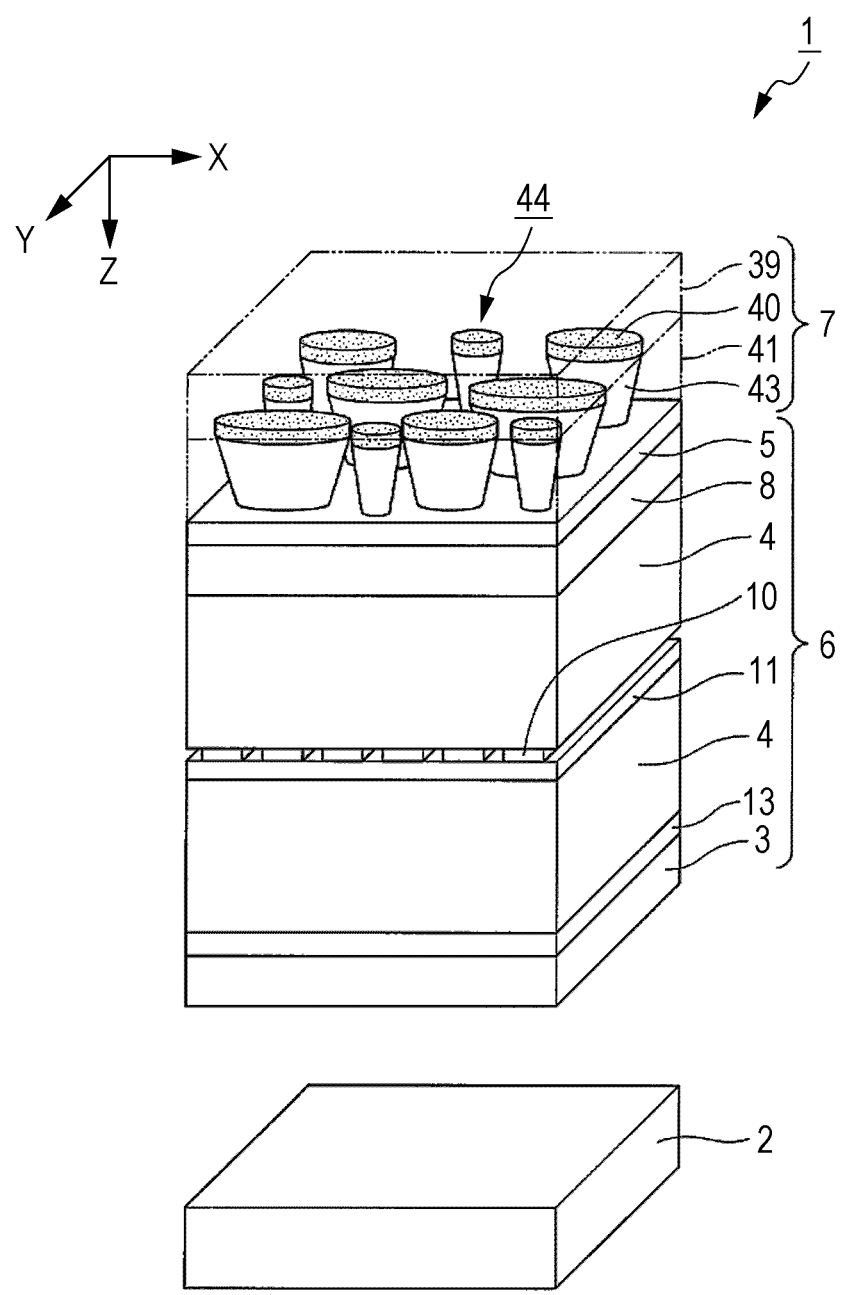
FIG. 1 is a perspective view illustrating a liquid crystal display device according to a first embodiment.
Figure 2A:
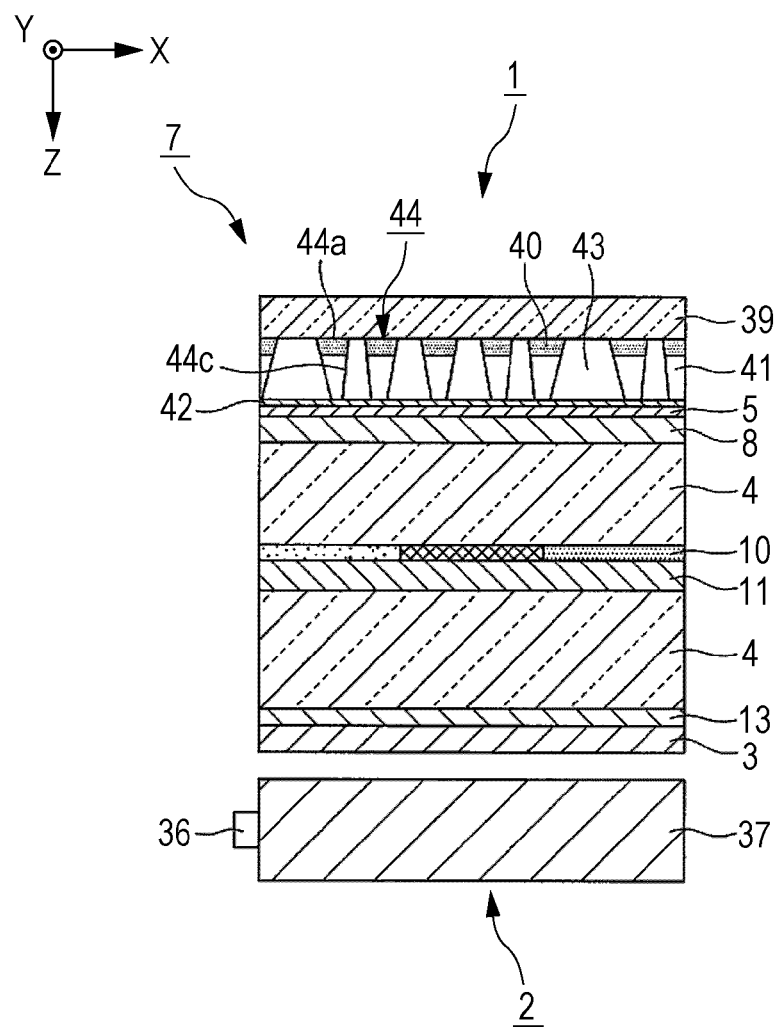
FIG. 2A is a sectional view of the liquid crystal display device.
Figure 2B:
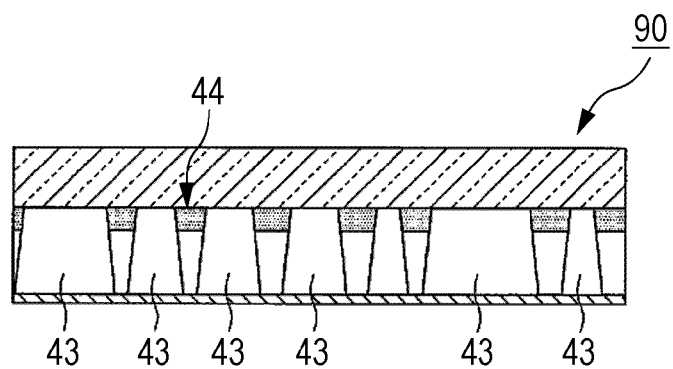
FIG. 2B is a sectional view of the liquid crystal display device.

First Embodiment (1) Outline of Liquid Crystal Display Device
(1.1) Overall Configuration of Liquid Crystal Display Device A first embodiment of the present invention will be described below with reference to FIGS. 1 to 7D. FIG. 1 is a perspective view of the liquid crystal display device according to this embodiment when viewed from an obliquely upward position (viewing side). FIGS. 2A and 2B are each a sectional view of the liquid crystal display device according to this embodiment.

A liquid crystal display device 1 (display device) according to this embodiment includes, as illustrated in FIGS. 1 and 2A, a backlight 2 (light source), a liquid crystal panel 6 (display body), and a light control film 7 (viewing-angle widening member or light diffusing member), the liquid crystal panel 6 including a first polarizing plate 3, a first phase difference plate 13, a pair of glass substrates 4 sandwiching a liquid crystal layer 11 and a color filter substrate 10 therebetween, a second phase difference plate 8, and a second polarizing plate 5. While FIGS. 1, 2A and 2B schematically illustrate each of the pair of glass substrates 4, which sandwich the liquid crystal layer and the color filter, etc. therebetween, in the form of one plate, the detailed structure of the glass substrate is described later with reference to FIG. 3. An observer sees display from the upper side of the liquid crystal display device 1, as viewed in FIG. 2A, where the light control film 7 is arranged. In the following description, therefore, the side where the light control film 7 is arranged is called the viewing side, and the side where the backlight 2 is arranged is called the backside.

In the liquid crystal display device 1 of this embodiment, light emitted from the backlight 2 is modulated by the liquid crystal panel 6, and predetermined images, characters, etc. are displayed with the modulated light. When the light output from the liquid crystal panel 6 passes through the light control film 7, the light is output from the light control film 7 in a state having a wider angle distribution of output light than that of light before entering the light control film 7. Therefore, the observer can see the display at a wider viewing angle.

(1.2) Structure of Liquid Crystal Panel

A practical structure of the liquid crystal panel 6 will be described below.

While the description is made here, by way of example, in connection with an active-matrix transmissive liquid crystal panel, liquid crystal panels to which the present invention can be applied are not limited to that type of liquid crystal panel. The liquid crystal panel to which the present invention is applied may be, e.g., a semi-transmissive (transflective) liquid crystal panel, a reflective liquid crystal panel, or a simple-matrix (passive-matrix) liquid crystal panel not including a switching Thin Film Transistor (hereinafter abbreviated to "TFT") for each pixel.

Figure 3:
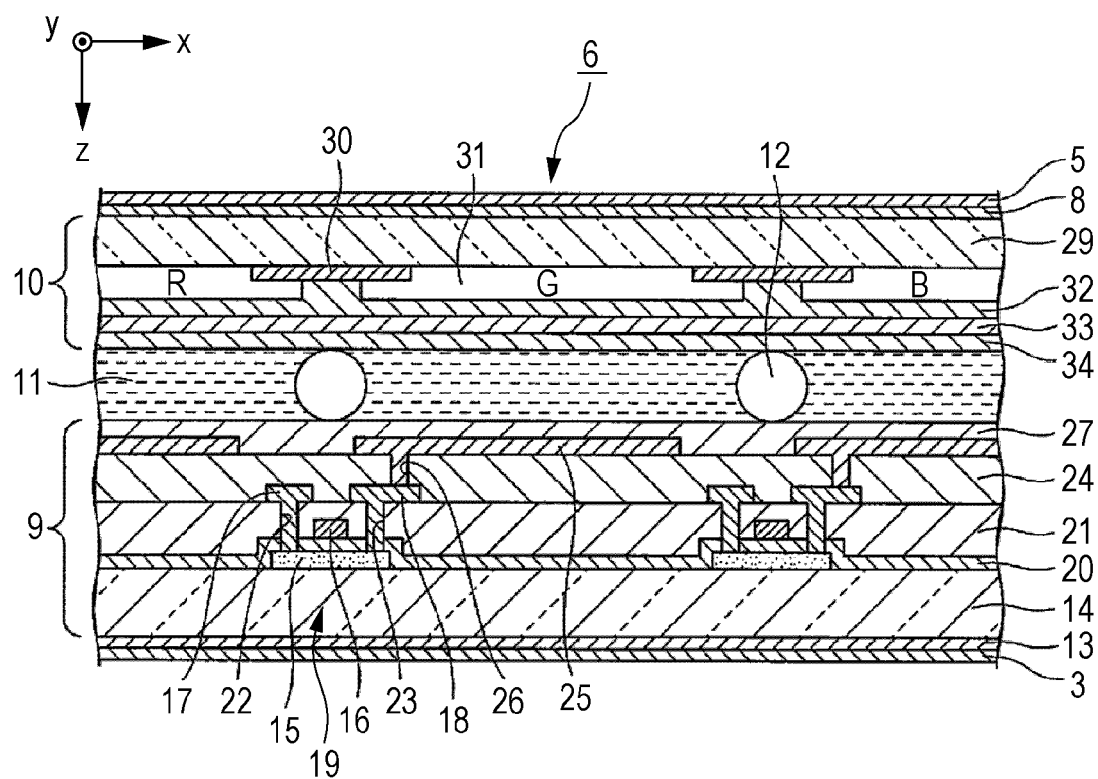
FIG. 3 is a sectional view illustrating a liquid crystal panel in the liquid crystal display device.

FIG. 3 is a vertical sectional view of the liquid crystal panel 6.

The liquid crystal panel 6 includes, as illustrated in FIG. 3, a TFT substrate 9 serving as a switching element substrate, the color filter substrate 10 arranged to face the TFT substrate 9, and a liquid crystal layer 11 sandwiched between the TFT substrate 9 and the color filter substrate 10. The liquid crystal layer 11 is enclosed in a space surrounded by the TFT substrate 9, the color filter substrate 10, and a frame-shaped sealing member (not illustrated) for holding the TFT substrate 9 and the color filter substrate 10 in a state bonded to each other with a predetermined spacing kept between them.

The liquid crystal panel 4 in this embodiment displays images, etc. in a VA (Vertical Alignment) mode, for example, and the liquid crystal layer 11 employs a vertical-alignment liquid crystal having negative dielectric constant anisotropy. Between the TFT substrate 9 and the color filter substrate 10, spherical spacers 12 are arranged to hold constant the spacing between both the substrates. The display mode is not limited to the above-mentioned VA mode. As another example, a TN (Twisted Nematic) mode, an STN (Super Twisted Nematic) mode, or an IPS (In-Plane Switching) mode can also be used.

A plurality of pixels (not illustrated), i.e., a minimum unit region for display, is arranged in a matrix pattern on the TFT substrate 9. On the TFT substrate 9, there are further formed a plurality of source bus lines (not illustrated) extending parallel to one another, and a plurality of gate bus lines (not illustrated) extending parallel to one another and perpendicular to the plural source bus lines. Thus, the plural source bus lines and the plural gate bus lines are formed in a lattice pattern on the TFT substrate 9, and one pixel is formed by a rectangular region demarcated by two adjacent source bus lines and two adjacent gate bus lines. The source bus lines are connected to source electrodes of TFTs described below, and the gate bus lines are connected to gate electrodes of the TFTs.

A TFT 19 including a semiconductor layer 15, a gate electrode 16, a source electrode 17, a drain electrode 18, etc. is formed on a surface of a transparent substrate 14, which constitutes the TFT substrate 9, on the side closer to the liquid crystal layer 11. The transparent substrate 14 may be, e.g., a glass substrate. A semiconductor layer 15 made of a semiconductor material, such as CGS (Continuous Grain Silicon), LPS (Low-temperature Poly-Silicon), or α-Si (Amorphous Silicon), is formed on the transparent substrate 14. Furthermore, a gate insulating film 20 is formed on the transparent substrate 14 and covers the semiconductor layer 15. The gate insulating film 20 may be made of, for example, a silicon oxide film, a silicon nitride film, or a multilayered film of the formers.

On the gate insulating film 20, the gate electrode 16 is formed to face the semiconductor layer 15. The gate electrode 16 may be made of, for example, a multilayered film of W (tungsten)/TaN (tantalum nitride), Mo (molybdenum), Ti (titanium), or Al (aluminum).

A first interlayer insulating film 21 is formed on the gate insulating film 20 and covers the gate electrode 16. The first interlayer insulating film 21 may be made of, for example, a silicon oxide film, a silicon nitride film, or a multilayered film of the formers. The source electrode 17 and the drain electrode 18 are formed on the first interlayer insulating film 21. The source electrode 17 is connected to a source region of the semiconductor layer 15 through a contact hole 22 that penetrates through both the first interlayer insulating film 21 and the gate insulating film 20.

Similarly, the drain electrode 18 is connected to a drain region of the semiconductor layer 15 through a contact hole 23 that penetrates through both the first interlayer insulating film 21 and the gate insulating film 20. The source electrode 17 and the drain electrode 18 may be each made of a similar conductive material to that described above to be used as the gate electrode 16. A second interlayer insulating film 24 is formed on the first interlayer insulating film 21 and covers the source electrode 17 and the drain electrode 18. The second interlayer insulating film 24 may be made of a similar material to that described above to be used as the first interlayer insulating film 21, or made of an organic insulating material.

A pixel electrode 25 is formed on the second interlayer insulating film 24. The pixel electrode 25 is connected to the drain electrode 18 through a contact hole 26 that penetrates through the second interlayer insulating film 24. Accordingly, the pixel electrode 25 is connected to a drain region of the semiconductor layer 15 through the drain electrode 18 that serves as a relay electrode.

The pixel electrode 25 may be made of, for example, a transparent conductive material such as ITO (Indium Tin Oxide) or IZO (Indium Zinc Oxide). With the structure described above, when a scan signal is supplied through the gate bus line and the TFT 19 is turned on, an image signal supplied to the source electrode 17 through the source bus line is supplied to the pixel electrode 25 through the semiconductor layer 15 and the drain electrode 18. Moreover, an alignment film 27 is formed over an entire surface of the second interlayer insulating film 24 and covers the pixel electrodes 25. The alignment film 27 develops an alignment restriction force to vertically align liquid crystal molecules that constitute the liquid crystal layer 11. It is to be noted that the TFT may be a bottom-gate TFT illustrated in FIG. 3, or a top-gate TFT.

On the other hand, a black matrix 30, a color filter 31, a planarizing layer 32, a counter electrode 33, and an alignment film 34 are successively formed on a surface of a transparent substrate 29, which constitutes the color filter substrate 10, on the side closer to the liquid crystal layer 11. The black matrix 30 has the function of blocking transmission of light in regions between pixels. The black matrix 30 is made of metal such as Cr (chromium) or a multilayered film of Cr/oxidized Cr, or a photoresist obtained by dispersing carbon particles in a photosensitive resin.

The color filter 31 contains dyes of red (R), green (G), and blue (B), and one color filter 31 of any of R, G or B is arranged to face one pixel electrode 25 on the TFT substrate 9. The planarizing layer 32 is formed of an insulating film covering the black matrix 30 and the color filter 31. The planarizing layer 32 has the function of reducing a level difference caused by the presence of the black matrix 30 and the color filter 31, and providing a planar surface.

The counter electrode 33 is formed on the planarizing layer 32. The counter electrode 33 may be made of a similar transparent conductive material to that used as the pixel electrode 25. The alignment film 34 developing a vertical alignment restriction force is formed over an entire surface of the counter electrode 33. The color filter 31 may be constituted in a larger number of colors than three of R, G and B.

(1.3) Structure of Backlight

As illustrated in FIG. 2A, the backlight 2 includes a light source 36, e.g., a light emitting diode or a cold cathode tube, and a light guide plate 37 for guiding light emitted from the light source 36 to the liquid crystal display panel 4. The light guide plate 37 has an output surface from which light is output toward the liquid crystal display panel 6, and a back surface opposite to the output surface. A plurality of prisms is formed on the back surface (though not illustrated). Each of the prisms formed on the back surface has two slopes (not illustrated), which are inclined at predetermined different angles relative to the output surface, such that the light output from the backlight 2 has higher intensity and higher directivity in the direction normal to a display surface.

The backlight 2 may be of the edge-lighting type that the light source 36 is arranged at an end surface of the light guide plate 37 as illustrated, or of the direct-lighting type that a light source is arranged just under a light guide member.

The backlight 2 used in this embodiment is desirably a backlight having directivity given by control of the light output direction, i.e., the so-called directional backlight. By employing the directional backlight causing collimated or substantially collimated light to enter a later-described light diffusing portion of the light control film 7, it is possible to reduce a blur and to increase a utilization rate of light. A brightness distribution of the directional backlight is described later.

The first polarizing plate 3 functioning as a polarizer is disposed on one side of the pair of glass substrates 4 closer to the backlight 2. The second polarizing plate 5 functioning as an analyzer is disposed between the pair of glass substrates 4 and a light diffusing sheet 7. The first phase difference plate 13 and the second phase difference plate 8, each functioning to compensate for a phase difference of light, are disposed respectively between the first polarizing plate 3 and the pair of glass substrates 4 and between the second polarizing plate 5 and the pair of glass substrates 4 (see FIG. 2A).

(2) Structure of Light Control Film

The light control film 7 will be described in detail below.

The light control film 7 includes, as illustrated in FIGS. 1 and 2A, a transparent base material 39, a plurality of light blocking portions 40 formed on one surface (i.e., a surface opposite to the viewing side) of the transparent base material 39, and a light diffusing layer 41 (light transmissive material layer) formed on the one surface of the transparent base material 39. As illustrated in FIG. 2A, the light control film 7 is fixed onto the second polarizing plate 5 with an adhesive layer 42 interposed therebetween in such a posture that one side of the light control film 7 where the light diffusing layer 41 is disposed is positioned to face the second polarizing plate 5, and that the other side of the light control film 7 closer to the transparent base material 39 is positioned to face the viewing side.

The transparent base material 39 is preferably a base material made of transparent resin, e.g., a film of triacetyl cellulose (TAC), polyethylene terephthalate (PET), polycarbonate (PC), polyethylene naphthalate (PEN), or polyethersulfone (PES). The transparent base material 39 serves as an underlying layer when materials of the light blocking portions 40 and the light diffusing layer 41 are coated in a later-described manufacturing process. Therefore, the transparent base material 39 is required to have heat resistance and mechanical strength endurable in a heat treatment step of the manufacturing process.

In view of the above-mentioned point, a base material made of glass may be used as the transparent base material 39 instead of the base material made of resin. A total light transmittance of the transparent base material 39 is preferably 90% or more in accordance with the stipulation of JIS K7361-1. When the total light transmittance is 90% or more, sufficient transparency is obtained. In this embodiment, a transparent resin-made base material having a thickness of 100 μm is used as one example.

As illustrated in FIG. 1, the plural light blocking portions 40 are formed in a scattered state on the one surface (i.e., the surface opposite to the viewing side) of the transparent base material 39. Here, an x-axis is defined as representing a predetermined direction in a plane parallel to a picture surface of the liquid crystal panel 6, a y-axis is defined as representing a direction perpendicular to the x-axis in the above-mentioned plane, and a z-axis is defined as representing a direction of thickness of the liquid crystal display device 1.

Figure 4A:
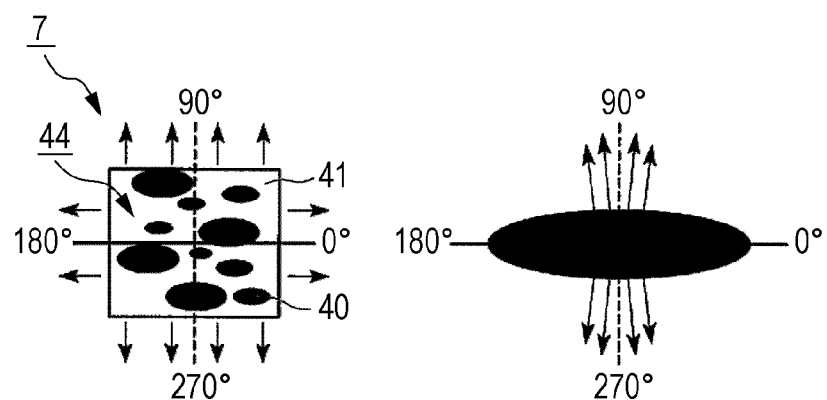
FIG. 4A is an illustration to explain shapes of light blocking portions and reflection of light at lateral surfaces of a light diffusing portion in a light control film in the liquid crystal display device.
Figure 4B:
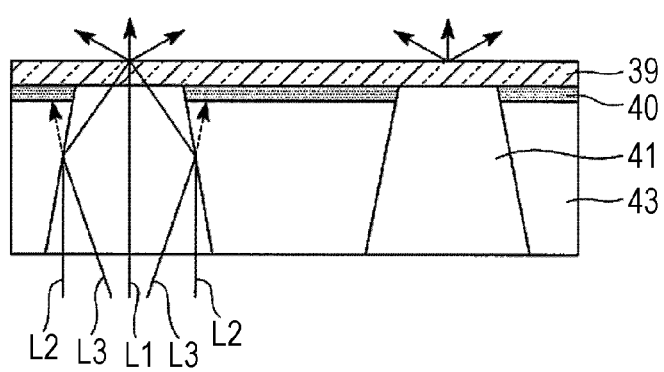
FIG. 4B is an illustration to explain the shapes of the light blocking portions and reflection of light at the lateral surfaces of the light diffusing portion of the light control film in the liquid crystal display device.

In this embodiment, as illustrated in FIG. 4A, when looking at the light control film 7 from the z-axis direction, the light blocking portions 40 are each formed in a dot-like plan shape that is asymmetrical in the up-and-down and right-to-left directions, such as represented by an elliptic shape. Stated in another way, the light blocking portion 40 has such a dot-like shape that a light blocking layer has a larger width in the direction of azimuth angle of 0 degree-180 degrees denoted by a solid line in the drawing and a smaller width in the direction of azimuth angle of 90 degrees-270 degrees denoted by a dotted line in the drawing (see FIG. 4A).

Figure 4C:
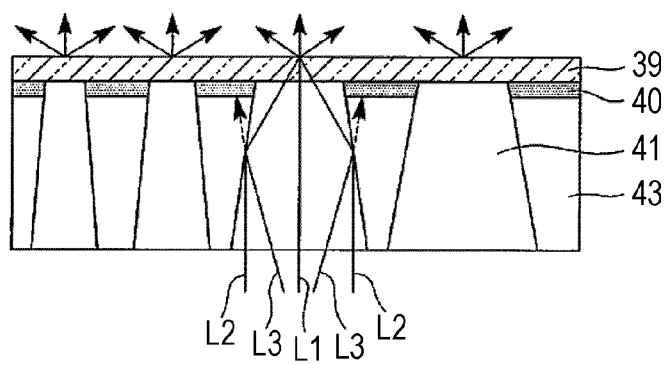
FIG. 4C is an illustration to explain the shapes of the light blocking portions and reflection of light at the lateral surfaces of the light diffusing portion of the light control film in the liquid crystal display device.

Looking at the light control film 7 in section, therefore, a side area of the light diffusing portion in the direction of azimuth angle of 0 degree-180 degrees (see FIG. 4B) is smaller than a side area of the light diffusing portion in the direction of azimuth angle of 90 degrees-270 degrees (see FIG. 4C). Thus, according to the light control film 7 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

Figure 4D:
FIG. 4D is an illustration to explain the shapes of the light blocking portions of the light control film in the liquid crystal display device.

The plan shape of the light blocking portion 40 may have irregularities along its peripheral edge insofar as the plan shape extends substantially perpendicularly to a certain azimuth, e.g., the direction of azimuth angle of 90 degrees-270 degrees (see FIG. 4D).

Sizes of the asymmetrical dots are not limited to a particular certain value, and dot shapes having various sizes may be present together. Furthermore, layout of the dots is not limited to a regular array or a cyclic array. In addition, the dots constituting the light blocking portions 40 may be formed in overlapped relation.

The light blocking portions 40 are each formed as a layer made of black pigment, dye, or resin having light absorbability and photosensitivity, such as a black resist containing carbon black, for example. Using resin containing carbon black is advantageous in that, because a film constituting the light blocking portions 40 can be formed in a printing step, an amount of the material used is small and a throughput is high. Furthermore, a metal film made of Cr (chromium) or a multilayered film of Cr/oxidized Cr may be used instead. Using such a metal film or a multilayered film is advantageous in that, because the film has high optical density, light can be sufficiently absorbed by a thinner film.

The light diffusing layer 41 is made of an organic material having optical transparency and photosensitivity, such as an acryl resin or an epoxy resin.

Moreover, a total light transmittance of the light diffusing layer 41 is preferably 90% or more in accordance with the stipulation of JIS K7361-1. When the total light transmittance is 90% or more, sufficient transparency is obtained. A thickness of the light diffusing layer 41 is set sufficiently larger than that of the light blocking portion 40. In this embodiment, the thickness of the light diffusing layer 41 is about 25 μm, for example, and the thickness of the light blocking portion 40 is about 150 nm, for example.

In regions of the light diffusing layer 41 where the light blocking portions 40 are formed, hollow spaces 43 are each defined in such a shape that a sectional area of the hollow space 43 cut along a plane parallel to one surface of the transparent base material 39 is larger on the side close to the light blocking portion 40 and is gradually reduced toward the side away from the light blocking portion 40. Stated in another way, the hollow space 43 has a truncated conical shape in the so-called forward tapered form when viewed from the side close to the transparent base material 39. The interior of the hollow space 43 is an air layer. Other portions of the light diffusing layer 41 than the hollow spaces 43, i.e., portions where the transparent resin is continuously present, contribute to transmittance of light. In the following description, therefore, the remaining portion of the light diffusing layer 41 other than the hollow spaces 43 is also called a light diffusing portion 44. Light entering the light diffusing portion 44 is guided through the light diffusing portion 44 in a state substantially enclosed inside the light diffusing portion 44 while the light is totally reflected at the interface between the light diffusing portion 44 and the hollow space 43. The light is then output to the outside through the transparent base material 39.

Figure 5A:
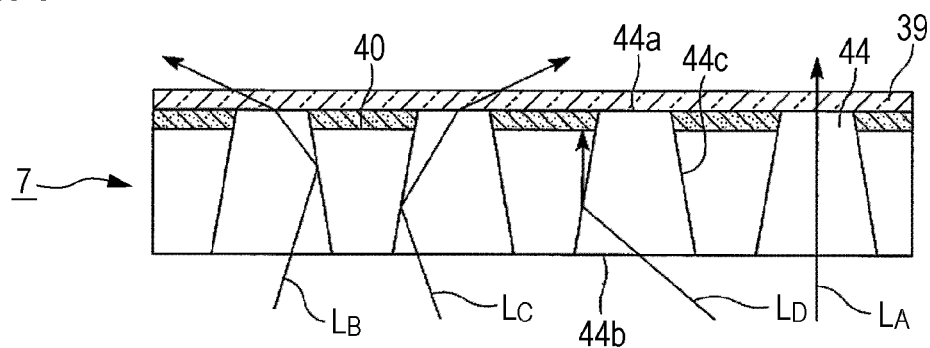
FIG. 5A is a schematic view to explain the action of the light control film.

Because the light control film 7 is arranged, as illustrated in FIG. 2A, such that the transparent base material 39 faces the viewing side, a smaller-area surface (i.e., a surface contacting the transparent base material 39) of two opposite surfaces of the light diffusing portion 44 becomes a light output end surface 44a, and a larger-area surface (i.e., a surface on the side opposite to the transparent base material 39) becomes a light input end surface 44b, as illustrated in FIG. 5A. A lateral surface 44c (interface between the light diffusing portion 44 and the hollow space 43) of the light diffusing portion 44 has an inclination angle θ (i.e., an angle formed by the light output end surface 44a and the lateral surface 44c) that is preferably about 60° to 90°. However, the inclination angle of the lateral surface 44c of the light diffusing portion 44 is not limited to a particular range insofar as a loss of input light is not so large and the input light can be sufficiently diffused at the set inclination angle.

Figure 5B:
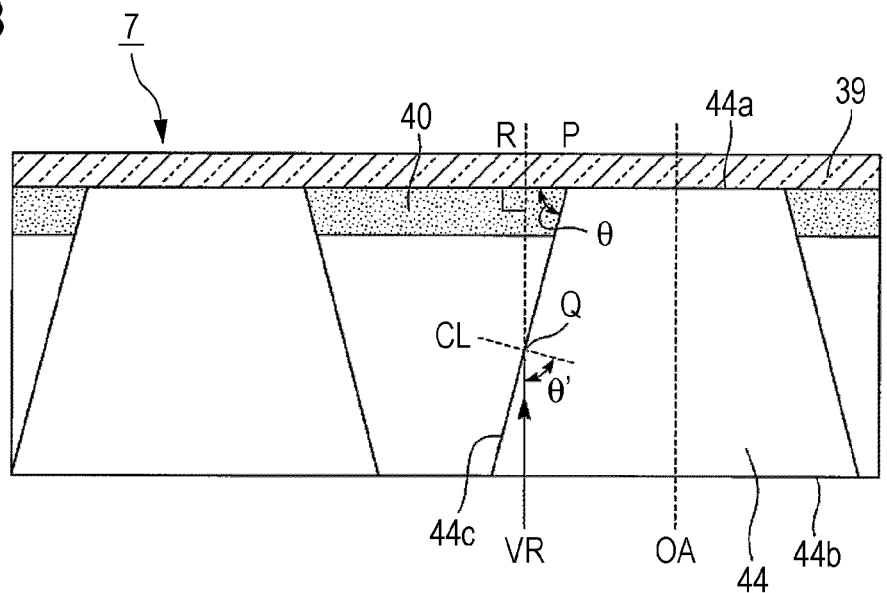
FIG. 5B is a schematic view to explain the action of the light control film.

As illustrated in FIG. 5B, the angle θ formed by the lateral surface 44c of the light diffusing portion 44 and the light output end surface 44a is set to an angle θ' (in unit of degree), which is larger than a critical angle, with respect to a normal line CL to the lateral surface 44c of the light diffusing portion 44 such that light entering parallel or substantially parallel to an optical axis OA is totally reflected. The angle θ formed by the lateral surface 44c of the light diffusing portion 44 and the light output end surface 44a perpendicular to the optical axis OA can be expressed by an angle QPR on an assumption that P denotes a point where the lateral surface 44c of the light diffusing portion 44 intersects the light output end surface 44a, Q denotes an input point where input light VR parallel to the optical axis OA enters the lateral surface 44c, and R denotes a point where a line being vertical to the light output end surface 44a and passing the point Q intersects the light output end surface 44a. In that case, since an angle PQR is expressed by (90−θ) degrees, the inclination angle θ of the lateral surface 44c of the light diffusing portion 44 is equal to the incidence angle θ' of the input light VR at the point Q. Accordingly, the inclination angle θ of the lateral surface 44c of the light diffusing portion 44 is set larger than the above-mentioned critical angle.

In this embodiment, air is present in the hollow space 43. Therefore, when the light diffusing portion 44 is formed of a transparent acryl resin, for example, the lateral surface 44c of the light diffusing portion 44 is provided as the interface between the transparent acryl resin and air. A difference in refractive index at the interface between the inside and the outside of the light diffusing portion 44 is larger when the hollow space 43 is filled with air than when the surroundings of the light diffusing portion 44 are made of another general material having a lower refractive index.

Thus, in accordance with the Snell's law, the light is totally reflected at the lateral surface 44c of the light diffusing portion 44 over a wider incidence angle range. As a result, a loss of light is further suppressed, and higher brightness can be obtained.

In the present invention, the presence of the material having a lower refractive index around the light diffusing portion 44 implies that the surroundings of the light diffusing portion 44 are brought into a state having a lower refractive index in order to cause total reflection of light. Thus, the present invention involves the case where the hollow space 43 is filled with inert gas, e.g., nitrogen, instead of air.

Alternatively, the interior of the hollow space 43 may be in a vacuum state or a state depressurized to a level lower than the atmospheric pressure.

As denoted by arrows LB and LC in FIG. 5A, input light entering at an angle larger than the critical angle is totally reflected at the lateral surface 44c and is output to the observer side after passing through the light diffusing portion 44. As denoted by an arrow LA in FIG. 5A, light passing through the light diffusing portion 44 without entering the lateral surface 44c is output to the observer side as it is. On the other hand, as denoted by an arrow LD in FIG. 5A, light entering at an angle smaller than the critical angle passes through the lateral surface 44c of the light diffusing portion 44 without being totally reflected.

In this embodiment, because the light blocking portions 40 having light absorbability are disposed in the other regions than the light diffusing portion 44, the light having passed through the lateral surface 44c of the light diffusing portion 44 is absorbed by the light blocking portions 40. Accordingly, there is no fear that display may be blurred due to, e.g., stray light, and contrast may be reduced. However, if an amount of the light passing through the lateral surface 44c of the light diffusing portion 44 increases, an amount of the light output to the viewing side is reduced, and an image with high brightness cannot be obtained. In the liquid crystal display device 1 of this embodiment, therefore, it is preferable to use a backlight emitting light at such an angle that the light does not enter the lateral surface 44c of the light diffusing portion 44 at the critical angle or less, i.e., a backlight having the so-called directivity.

In the light control film 7 illustrated in FIG. 2A, tapered shapes of the hollow spaces 43 defined by the light diffusing portion 44 are formed at plural different angles from each other. However, as in a light control film 90 illustrated in FIG. 2B, tapered shapes of hollow spaces 93 defined by light diffusing portion 94 are preferably formed at the same angle.

(3) Brightness Distribution of Directional Backlight

Figure 6A:
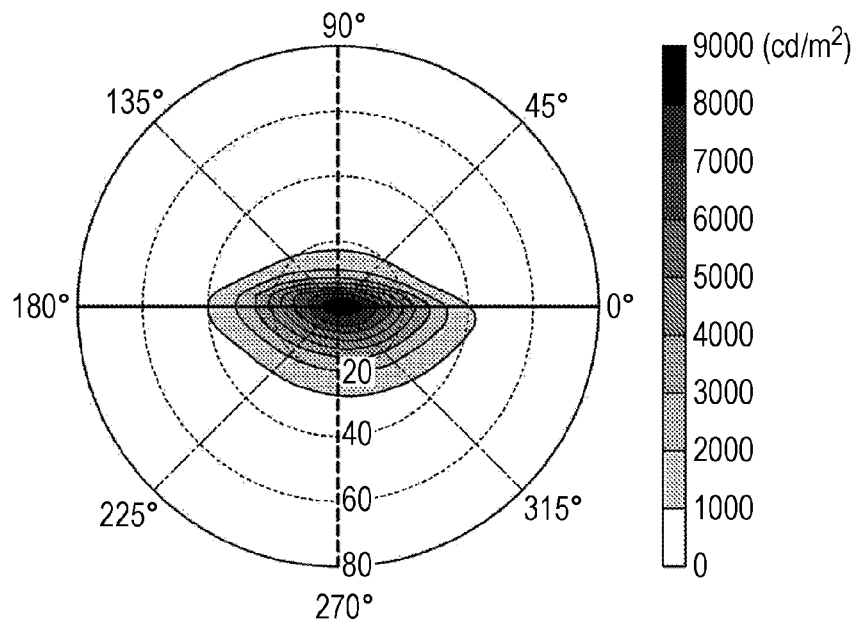
FIG. 6A is a plot to explain a brightness distribution of a directional backlight.
Figure 6B:
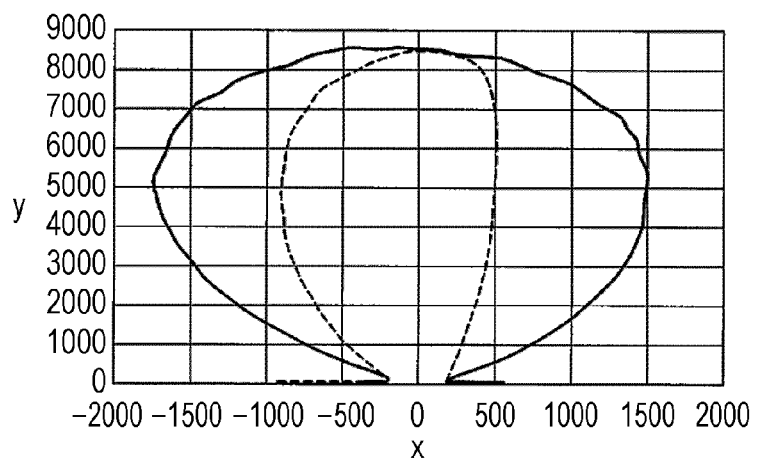
FIG. 6B is a plot to explain the brightness distribution of the directional backlight.

FIG. 6A plots a brightness distribution of the anisotropic directional backlight 2 used in this embodiment. In more detail, brightness increases toward a center from an outer side in the direction of polar angle, and an amount of output light is smaller in the direction of azimuth angle of 90 degrees-270 degrees denoted by a dotted line in the drawing than in the direction of azimuth angle of 0 degree-180 degrees denoted by a solid line in the drawing. FIG. 6B plots, as a polar coordinate graph, the brightness distribution of the directional backlight 2. The brightness distribution is substantially symmetrical in the direction of azimuth angle of 0 degree-180 degrees denoted by a solid line in the drawing, whereas the brightness distribution is asymmetrical in the direction of azimuth angle of 90 degrees-270 degrees denoted by a dotted line in the drawing. More specifically, the amount of output light is smaller in the direction of azimuth angle of 90 degrees than in the direction of azimuth angle of 270 degrees.

Figure 6C:
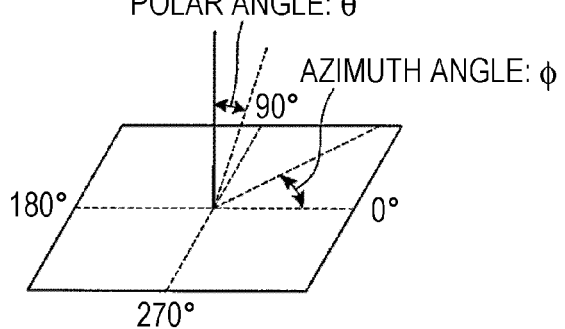
FIG. 6C is an illustration to explain the brightness distribution of the directional backlight.

FIG. 6C represents the relationship between a polar angle and an azimuth angle. The description is made on an assumption that an angle formed by the direction normal to the light control film 7 from the backlight 2 and the output light is defined as a polar angle, and a reference angle in the counterclockwise direction in a plane parallel to the light control film is defined as an azimuth angle.

Even when the directional backlight 2 having the above-described anisotropic brightness distribution is used, the viewing angle can be improved by combining the directional backlight 2 with the light control film 7 according to this embodiment, which diffuses light with higher intensity, namely outputs a larger amount of light, in the direction of azimuth angle of 90 degrees-270 degrees.

(4) Manufacturing Method for Light Control Film

A manufacturing method for the light control film 7 in the liquid crystal display device 1, having the above-explained structure, will be described below primarily about manufacturing steps of the light control film 7.

To explain outline of manufacturing steps of the liquid crystal panel 6 prior to detailed description, the TFT substrate 9 and the color filter substrate 10 are first fabricated separately. Then, the surface of the TFT substrate 9 on the side where the TFTs 19 are formed and the surface of the color filter substrate 10 on the side where the color filter 31 is formed are arranged to face each other, and the TFT substrate 9 and the color filter substrate 10 are bonded to each other with a sealing member interposed between them. Thereafter, a liquid crystal is filled into a space surrounded by the TFT substrate 9, the color filter substrate 10, and the sealing member. The first phase difference plate 13, the first polarizing plate 3, the second phase difference plate 8, and the second polarizing plate 5 are bonded to opposite surfaces of the fabricated liquid crystal panel by employing an optical adhesive, for example. The liquid crystal panel 6 is completed through the above-described steps.

The TFT substrate 9 and the color filter substrate 10 may be manufactured by ordinary methods, and description of the manufacturing methods for both the substrates is omitted here.

Figure 7A:
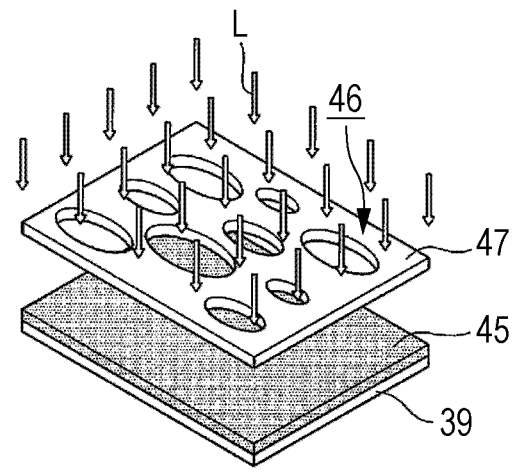
FIG. 7A is a perspective view illustrating one of successive manufacturing steps of the light control film.

First, as illustrated in FIG. 7A, a base material 39 made of triacetyl cellulose and having a thickness of 100 μm is prepared, and a coating film 45 with a thickness of 150 nm is formed by coating a black negative resist, which contains carbon as a light blocking material, over one surface of the base material 39 by spin coating.

Then, the base material 39 including the coating film 45 formed thereon is placed on a hot plate, and the coating film 45 is pre-baked at a temperature of 90° C. As a result, a solvent in the black negative resist is volatilized.

Then, light L is applied to the coating film 45 for exposure through a photomask 47, which includes a plurality of opening patterns 46 formed in, e.g., elliptic plan shapes, by employing an exposure apparatus. At that time, an exposure apparatus utilizing an i-line at a wavelength of 365 nm, an h-line at a wavelength of 404 nm, and a mixed g-line at a wavelength of 436 nm is employed. An exposure amount is set to 100 mJ/cm$^2$.

Figure 7B:
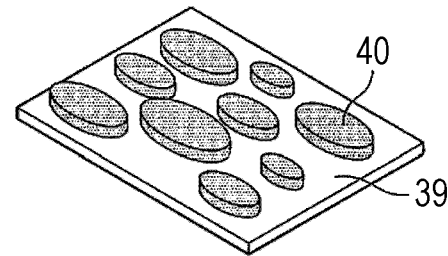
FIG. 7B is a perspective view illustrating one of the successive manufacturing steps of the light control film.

After performing the exposure using the photomask 47 as described above, the coating film 45 made of the black negative resist is developed with a dedicated development liquid, and then dried at 100° C. Thus, as illustrated in FIG. 7B, the plural light blocking portions 40 each having an elliptic plan shape, for example, are formed on one surface of the base material 39. In this embodiment, the hollow spaces 43 are formed in the next step by performing exposure of a transparent negative resist while the light blocking portions 40 each made of the black negative resist is used as a mask. Thus, positions of the opening patterns 46 in the photomask 47 correspond to positions where the hollow spaces 43 are formed.

The elliptic light blocking portions 40 correspond to regions (hollow spaces 43) where the light diffusing portion 44 is not formed in the next step.

The plural opening patterns 46 are all elliptic patterns having the major axes and the minor axes of various different lengths. While the opening patterns 46 are arranged neither regularly nor cyclically, the interval (pitch) between the adjacent opening patterns 46 is desirably smaller than the interval (pitch, e.g., 150 μm) between the pixels of the liquid crystal panel 6. With such an arrangement, since at least one light blocking portion 40 is formed within the pixel, an effect of widening the viewing angle can be obtained, for example, even when the light control film is combined with a liquid crystal panel having a small pixel pitch, such as used in a mobile device.

While, in this embodiment, the light blocking portions 40 are formed by photolithography using the black negative resist, a positive resist having light absorbability is also usable instead of the negative resist in the case of employing a photomask in which the opening patterns 46 and light blocking patters are reversed to those in the above-described embodiment. Alternatively, the light blocking portions 40 may be directly formed by, e.g., vapor deposition or printing.

Figure 7C:
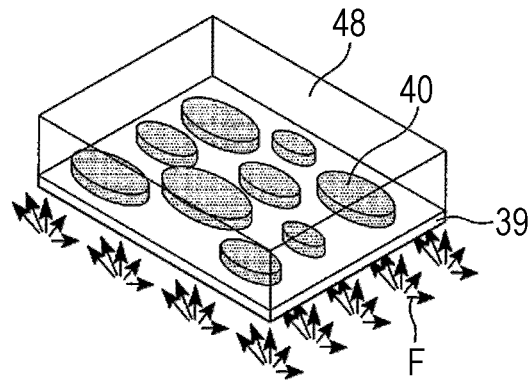
FIG. 7C is a perspective view illustrating one of the successive manufacturing steps of the light control film.

Then, as illustrated in FIG. 7C, a coating film 48 with a thickness of 25 μm is formed by coating, as a material of the light diffusing portion, a transparent negative resist made of an acryl resin over the light blocking portions 40 by spin coating.

Then, the base material 39 including the coating film 48 formed thereon is placed on a hot plate, and the coating film 48 is pre-baked at a temperature of 95° C. As a result, a solvent in the transparent negative resist is volatilized.

Then, light F is applied to the coating film 48 for exposure from the side including the base material 39 with the light blocking portions 40 used as masks. At that time, an exposure apparatus utilizing an i-line at a wavelength of 365 nm, an h-line at a wavelength of 404 nm, and a mixed g-line at a wavelength of 436 nm is employed. An exposure amount is set to 500 mJ/cm$^2$.

Thereafter, the base material 39 including the coating film 48 formed thereon is placed on the hot plate, and the coating film 48 is subjected to post exposure baking (PEB) at a temperature of 95° C.

Figure 7D:
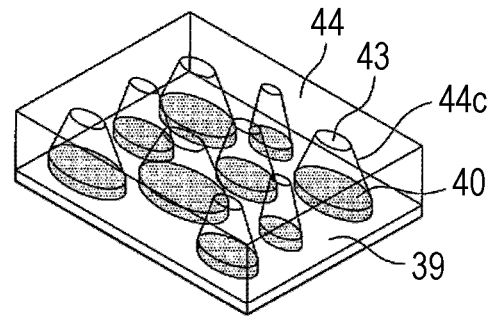
FIG. 7D is a perspective view illustrating one of the successive manufacturing steps of the light control film.

Then, the coating film 48 made of the transparent negative resist is developed with a dedicated development liquid, and then post-baked at 100° C. Thus, as illustrated in FIG. 7D, a transparent resin layer 41 including the plural hollow spaces 43 is formed on one surface of the base material 39. In this embodiment, since the exposure is performed using diffused light as illustrated in FIG. 7C, the transparent negative resist forming the coating film 48 is exposed in such a radially diverging shape as gradually spreading outward from the regions where the light blocking portions 40 are not formed. As a result, the hollow spaces 43 each having a forward tapered shape are formed, and the light diffusing portion 44 has a reverse-tapered shape. The inclination angle of the lateral surface 44c of the light diffusing portion 44 can be controlled depending on a degree of diffusion of the diffused light.

The light F used here may be parallel light, diffused light, or light having different intensity at a particular output angle than at other output angles, i.e., light having higher or lower intensity at a particular output angle. In the case using the parallel light, the inclination angle of the lateral surface 44c of the light diffusing portion 44 is given as a single inclination angle of about 60° to 90°, for example. In the case using the diffused light, a slope having a curved sectional shape is obtained in which the inclination angle changes continuously. In the case using the light having higher or lower intensity at the particular output angle, a slope having an inclination angle corresponding to the higher or lower intensity of the light is obtained. Thus, the inclination angle of the lateral surface 44c of the light diffusing portion 44 can be adjusted as described above. Accordingly, light diffusion in the light diffusion sheet 7 can be adjusted such that the objective viewability is obtained.

One of means for applying parallel light emitted from the exposure apparatus, as the light F, to the base material 39 is practiced, for example, by arranging a diffusion plate with haze of about 50 in an optical path of the light emitted from the exposure apparatus, and by applying the light through the diffusion plate.

As described above, the light control film 7 in this embodiment is completed through the steps illustrated in FIGS. 7A to 7D. A total light transmittance of the light control film 7 is preferably 90% or more. When the total light transmittance is 90% or more, sufficient transparency is obtained and the optical performance demanded for the light control film 7 can be sufficiently developed. The total light transmittance is measured in accordance with the stipulation of JIS K7361-1. While a liquid resist is used in the above-described embodiment, a film-like resist may be used instead.

Finally, the completed light control film 7 is bonded to the liquid crystal panel 6 with the adhesive layer 42 interposed between them in such a state that the base material 39 is positioned to face the viewing side and the light diffusing portion 44 is positioned to face the second polarizing plate 5, as illustrated in FIG. 2A.

The liquid crystal display device 1 according to this embodiment is completed through the above-described steps.

(5) Operation and Effects of Light Control Film

The effect of widening the viewing angle of the light control film 7 according to this embodiment will be described below with reference to FIGS. 4A, 4B, 4C, 4D, 6A and 4B.

In this embodiment, as illustrated in FIG. 4A, when looking at the light control film 7 from the z-axis direction, the light blocking portions 40 are each formed in a dot-like plan shape that is asymmetrical in the up-and-down and right-to-left directions, such as represented by an elliptic shape. Stated in another way, the light blocking portion 40 has such a dot-like shape that a light blocking layer has a larger width in the direction of azimuth angle of 0 degree-180 degrees denoted by a solid line in the drawing and a smaller width in the direction of azimuth angle of 90 degrees-270 degrees denoted by a dotted line in the drawing (see FIG. 4A).

Furthermore, sizes of the light blocking portions 40 are not limited to a certain value, and dot shapes having various sizes are present together. Moreover, the light blocking portions 40 are not arranged in certain regular or cyclic patterns, and are arranged at random. Looking at the light control film 7 in section, therefore, a side area of the light diffusing portion 44 in the direction of azimuth angle of 0 degree-180 degrees (see FIG. 4B) is smaller than a side area of the light diffusing portion 44 in the direction of azimuth angle of 90 degrees-270 degrees (see FIG. 4C).

Thus, according to the light control film 7 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

On the other hand, when the directional backlight 2 used in this embodiment has such a brightness distribution that, as illustrated in FIGS. 6A and 6B, brightness increases toward a center from an outer side in the direction of polar angle, and that an amount of output light is smaller in the direction of azimuth angle of 90 degrees-270 degrees denoted by a dotted line in the drawing than in the direction of azimuth angle of 0 degree-180 degrees denoted by a solid line in the drawing, the light is required to be more strongly diffused in the direction of azimuth angle of 90 degrees-270 degrees after having passed through the liquid crystal panel 6 because of relatively high directivity.

In view of the above-mentioned point, a liquid crystal display device with a significant effect of widening the viewing angle in the direction of azimuth angle of 90 degrees to 270 degrees can be realized by combining the direction of azimuth angle of 90 degrees-270 degrees in which the backlight has higher directivity with the direction of azimuth angle of 90 degrees-270 degrees in which the light control film diffuses light more strongly.

Moreover, a light and black reversing (tone reversing) phenomenon in half-tone display and the so-called blocked-up shadow phenomenon causing a solid black image, which may be generated in a TN (Twisted Nematic) liquid crystal display device, can be improved by combining a directional backlight having an asymmetrical light distribution characteristic in e.g., a directional backlight having higher directivity in the direction of azimuth angle of 90 degrees-270 degrees, and the light control film having a higher light diffusion characteristic in the direction of azimuth angle of 90 degrees-270 degrees in alignment with the direction of azimuth angle of 270 degrees, which is the clear viewing direction of a TN (Twisted Nematic) liquid crystal.

Light L3 (see FIGS. 4B and 4C) obliquely entering the light control film 7 is light having obliquely passed through the liquid crystal panel 4 and is light different from desired retardation, i.e., light acting to reduce the so-called display contrast. In the light control film 7 of this embodiment, such light is cut by the light blocking portions 40, and the display contrast can be increased.

In a light control film of related art, individual light diffusing portions are each formed in an isolated state. Therefore, for example, when density of the light diffusing portions is increased and a light diffusing layer is more finely formed to increase a degree of light diffusion, a contact area of the light diffusing portion and the base material is reduced. As a result, an adhesion force between the light diffusing portion and the base material is weakened, thus causing defects, such as peeling-off and tilting, of the light diffusing portion due to application of external forces, for example. Hence the desired light diffusing function cannot be developed.

In contrast, in the light control film 7 of this embodiment, the plural hollow spaces 43 formed in the light diffusing layer 41 are each isolated, whereas the light transmissive material layer constituting the light diffusing portion 44 has a continuous shape in plane. Therefore, a contact area of the light diffusing portion 44 and the base material 39 is sufficiently obtained. As a result, an adhesion force between the light diffusing portion 44 and the base material 39 is stronger than in the related art, and the defect of the light diffusing portion 44 due to application of external forces, for example, is less apt to occur. Hence the desired light diffusing function can be developed.

If the light blocking portions 40 are not disposed on the base material 39, outside light entering the light control film 7 from the viewing side is repeatedly reflected in the hollow spaces 43, etc. and is observed as scattered light on the viewing side. Such scattering of the outside light significantly reduces viewability in a bright place. This causes the so-called "black level floating", i.e., a phenomenon that black appears whitey when black is displayed, and degrades contrast. Hence an image cannot be observed satisfactorily. In contrast, in the light control film 7 of this embodiment, the above-mentioned problems can be overcome because the plural light blocking portions 40 are disposed on the base material 39.

Second Embodiment

A second embodiment of the present invention will be described below with reference to FIGS. 8A and 8B.

A liquid crystal display device of the second embodiment has the same basic configuration as that in the first embodiment, and the second embodiment is different from the first embodiment in arrangement of the light blocking portions 40 in the light control film 7. Moreover, a directional backlight to be combined has an isotropic brightness distribution unlike the first embodiment. For that reason, in the second embodiment, description of the basic configuration of the liquid crystal display device is omitted, and only the light control film and the directional backlight are described. Furthermore, in FIGS. 8A and 8B and the following description, common components to those in the drawings referred to in the first embodiment are denoted by the same reference symbols, and detailed description of those components is omitted.

(1) Structure of Light Control Film

Figure 8A:
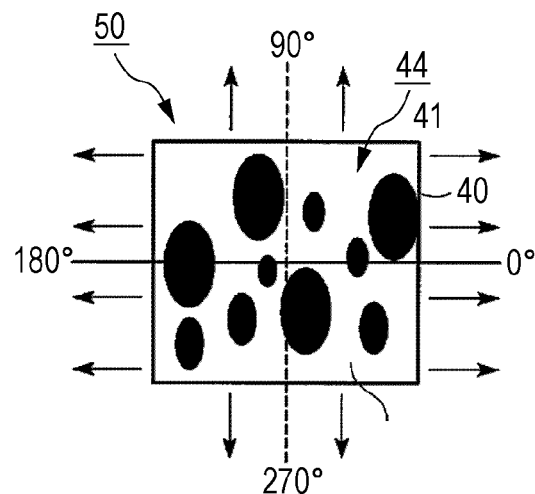
FIG. 8A is an illustration to explain shapes of light blocking portions of a light control film in a liquid crystal display device according to a second embodiment.

In this embodiment, as illustrated in FIG. 8A, when looking at a light control film 50 from the z-axis direction, the light blocking portions 40 are each formed, as in the first embodiment, in a dot-like plan shape that is asymmetrical in the up-and-down and right-to-left directions, such as represented by an elliptic shape. However, the light blocking portion 40 is arranged in such a dot-like shape that a light diffusing layer has a smaller width in the direction of azimuth angle of 0 degree-180 degrees denoted by a solid line in the drawing and a larger width in the direction of azimuth angle of 90 degrees-270 degrees denoted by a dotted line in the drawing.

Thus, according to the light control film 50 of this embodiment, an amount of light diffused and output in the direction of azimuth angle of 0 degree-180 degrees is relatively large, and an amount of light diffused and output in the direction of azimuth angle of 90 degrees-270 degrees is relatively small. In other words, light diffusion asymmetrical with respect to azimuth is realized.

(2) Brightness Distribution of Directional Backlight

Figure 8B:
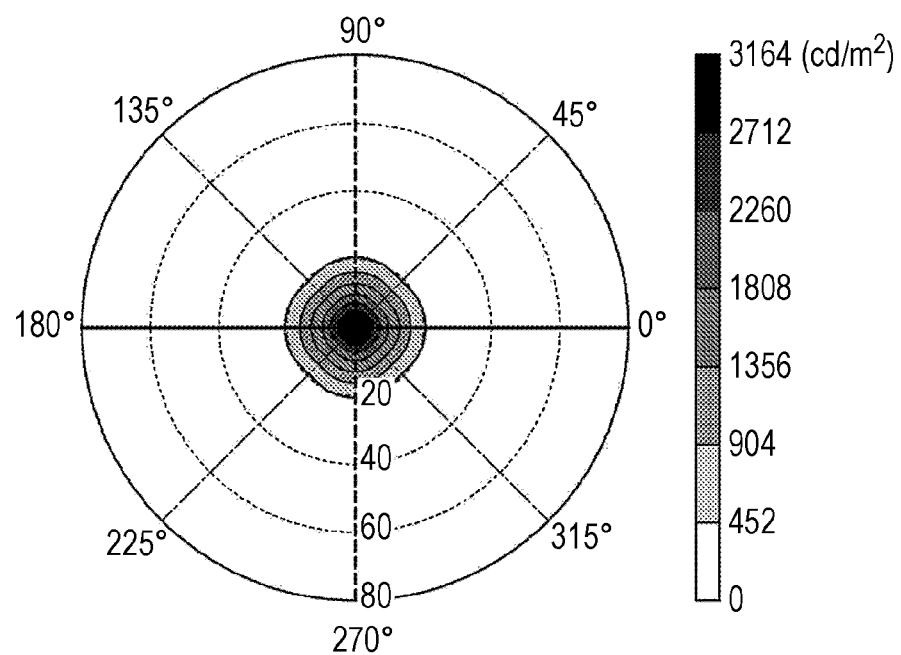
FIG. 8B is a plot to explain a brightness distribution of a directional backlight in the liquid crystal display device according to the second embodiment.

FIG. 8B plots a brightness distribution of a directional backlight combined with the above-described light control film 50 in this embodiment. In more detail, brightness increases toward a center from an outer side in the direction of polar angle, and the brightness distribution is substantially symmetric in any of the direction of azimuth angle of 0 degree-180 degrees denoted by a solid line in the drawing and the direction of azimuth angle of 90 degrees-270 degrees denoted by a dotted line in the drawing. Thus, the amount of output light is substantially uniform and isotropic.

(3) Operation and Effects of Second Embodiment

According to this embodiment, a significant effect of widening the viewing angle in the direction of azimuth angle of 0 degree to 180 degrees can be realized by constituting the liquid crystal display device 1 in combination of the above-mentioned isotropic directional backlight 2 and the light control film 50 in which the amount of light diffused and output in the direction of azimuth angle of 0 degree-180 degrees is relatively large and the amount of light diffused and output in the direction of azimuth angle of 90 degrees-270 degrees is relatively small.

By applying the thus-combined liquid crystal display device to an information display member in a vehicle-loaded navigation system, for example, the viewing angle in image display can be widened, and viewability in the right-and-left direction can be improved.

As in the first embodiment, the plan shape of the light blocking portion 40 may have irregularities along its peripheral edge insofar as the plan shape extends substantially perpendicularly to a certain azimuth, e.g., the direction of azimuth angle of 0 degree-180 degrees. Sizes of the asymmetrical dots are not limited to a particular certain value, and dot shapes having various sizes may be present together. Furthermore, layout of the dots is not limited to a regular array or a cyclic array. In addition, the dots constituting the light blocking portions 40 may be formed in overlapped relation.

Also in the light control film 50 of this embodiment, contrast in display can be increased by cutting light, which has obliquely entered the light control film 50, with the presence of the light blocking portions 40. Moreover, the light transmissive material layer constituting the light diffusing portion 44 has a continuous shape in plane. Therefore, a contact area of the light diffusing portion 44 and the base material 39 is sufficiently obtained. As a result, an adhesion force between the light diffusing portion 44 and the base material 39 is increased, and the defect of the light diffusing portion 44 due to application of external forces, for example, are less apt to occur. Hence the desired light diffusing function can be developed. With the provision of the plural light blocking portions 40 on the base material 39, similar effects to those in the first embodiment can also be obtained in not only preventing a phenomenon that outside light entering the light control film 50 from the viewing side is repeatedly reflected in the hollow spaces 43, etc. and is observed as scattered light on the viewing side, but also in avoiding reduction of contrast.

Third Embodiment

A third embodiment of the present invention will be described below with reference to FIGS. 9A to 9C.

A liquid crystal display device of the third embodiment has the same basic configuration as that in the first and second embodiments, and the third embodiment is different from the first and second embodiments only in configuration of the light blocking portions in the light control film. For that reason, in the third embodiment, description of the basic configuration of the liquid crystal display device is omitted, and only the light control film is described.

Figure 9A:
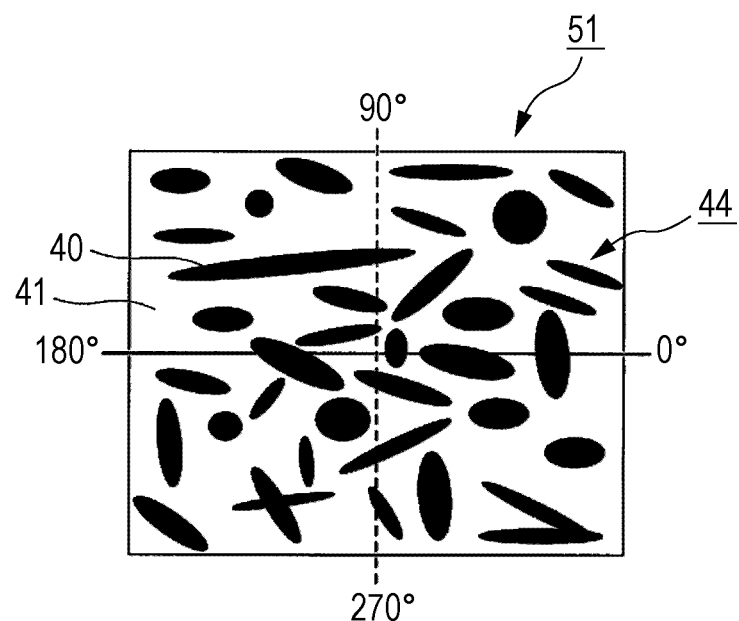
FIG. 9A is an illustration to explain shapes of light blocking portions of a light control film in a liquid crystal display device according to a third embodiment.
Figure 9B:
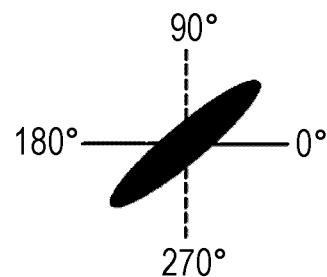
FIG. 9B is an illustration to explain the shape of the light blocking portion of the light control film in the liquid crystal display device according to the third embodiment.
Figure 9C:
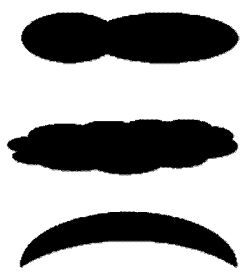
FIG. 9C is an illustration to explain the shapes of the light blocking portions of the light control film in the liquid crystal display device according to the third embodiment.

Furthermore, in FIGS. 9A to 9C and the following description, common components to those in the drawings referred to in the first and second embodiments are denoted by the same reference symbols, and detailed description of those components is omitted.

(1) Structure of Light Control Film

In the first and second embodiments, the plural light blocking portions 40 are all arranged with the directions of their major axes being oriented in a particular azimuth. For example, the directions of the major axes are arranged in the direction of azimuth angle of 0 degree-180 degrees denoted by the solid line in the drawing in the first embodiment, and in the direction of azimuth angle of 90 degrees-270 degrees denoted by the dotted line in the drawing in the second embodiment. On the other hand, in a light control film 51 of the third embodiment, as illustrated in FIG. 9A, when looking at the light control film 51 from the z-axis direction, the light blocking portions 40 are formed in such plan shapes as an isotropic circular shape and dot-like shapes with various anisotropic azimuths.

However, the light blocking portions 40 having the isotropic circular shape and the dot-like shapes with various anisotropic azimuths are arranged in the light control film 51 as a whole such that the light blocking layer in the direction of azimuth angle of 0 degree-180 degrees denoted by a solid line in the drawing is relatively long, and the light blocking portion 40 in the direction of azimuth angle of 90 degrees-270 degrees denoted by a dotted line in the drawing is relatively short (see FIG. 9B). More specifically, the major axis of the light blocking portion 40 is arranged at an azimuth angle in the range of −45 degrees to +45 degrees. Accordingly, as described above in the first embodiment, when looking at the light control film 51 in section, a side area of the light diffusing portion 44 in the direction of azimuth angle of 0 degree-180 degrees is smaller than a side area of the light diffusing portion 44 in the direction of azimuth angle of 90 degrees-270 degrees.

Thus, with the light control film 51 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

As illustrated in FIG. 9C, the plan shape of the light blocking portion 40 may have undulations or irregularities along its peripheral edge, or may be a crescent shape. Furthermore, the dots constituting the light blocking portions 40 may be formed in overlapped relation. Thus, it is just required that the directions of the major axes of the light blocking portions 40 perpendicularly intersect the direction of azimuth angle of 90 degrees-270 degrees at a relatively high rate in the whole of the light control film.

(2) Operation and Effects of Light Control Film

When, for example, the directional backlight 2 having the anisotropic brightness distribution, described above in the first embodiment, is used in the liquid crystal display device including the light control film 51 of this embodiment, the viewing angle in the direction of azimuth angle of 90 degrees to 270 degrees can be improved as a whole. In particular, since the light control film 51 of this embodiment can increase the amount of light diffused in the direction of azimuth angle of 90 degrees-270 degrees as a whole, a smooth change in the viewing angle can be obtained.

Moreover, when the directional backlight 2 having the isotropic brightness distribution, described in the second embodiment, is used, a smoother continuous change in the viewing angle can be obtained.

Fourth Embodiment

A fourth embodiment of the present invention will be described below with reference to FIG. 10.

A liquid crystal display device of the fourth embodiment has the same basic configuration as that in the first to third embodiments, and the fourth embodiment is different from the first to third embodiments only in configuration of the light blocking portions in the light control film. For that reason, in the fourth embodiment, description of the basic configuration of the liquid crystal display device is omitted, and only the light control film is described.

Figure 10:
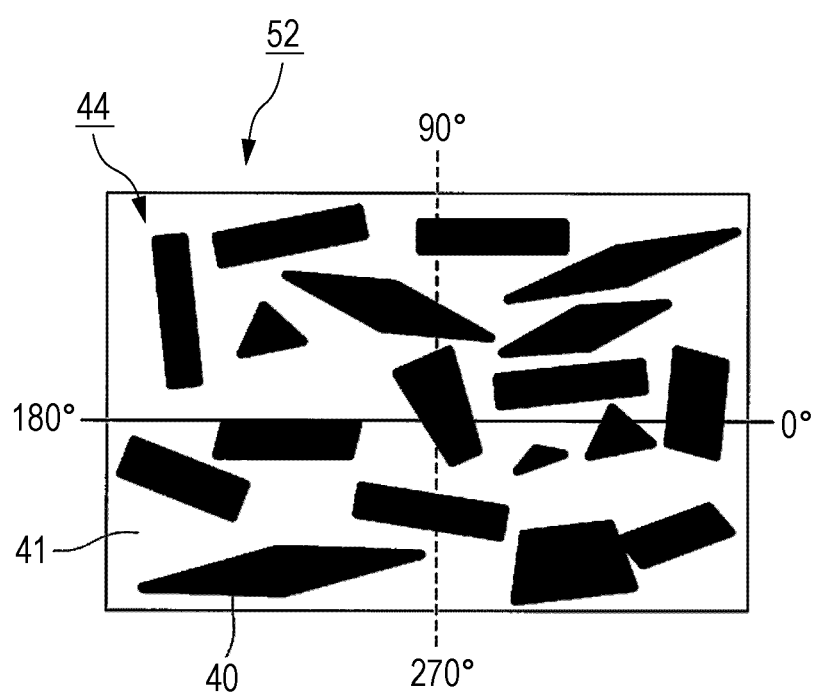
FIG. 10 is an illustration to explain shapes of light blocking portions of a light control film in a liquid crystal display device according to a fourth embodiment.

Furthermore, in FIG. 10 and the following description, common components to those in the drawings referred to in the first to third embodiments are denoted by the same reference symbols, and detailed description of those components is omitted.

(1) Structure of Light Control Film

In the first and second embodiments, the plural light blocking portions 40 are all arranged with the directions of their major axes being oriented in a particular azimuth. In the third embodiment, as illustrated in FIG. 9A, when looking at the light control film 51 from the z-axis direction, the light blocking portions 40 are formed in such plan shapes as an isotropic circular shape and dot-like shapes with various anisotropic azimuths, and the directions of the major axes of the light blocking portions 40 perpendicularly intersect the direction of azimuth angle of 90 degrees-270 degrees at a relatively high rate in the whole of the light control film (see FIG. 9A).

In an optical control film 52 of this embodiment, as illustrated in FIG. 10, when looking at the light control film 52 from the z-axis direction, the light blocking portions 40 are formed in polygonal dot-like plan shapes. Furthermore, the light blocking portions 40 are arranged in a state tilted toward, e.g., the direction of azimuth angle of 0 degree-180 degrees denoted by a solid line in the drawing and in a non-cyclic fashion. Thus, as a whole, the light blocking portions are relatively long in the direction of azimuth angle of 0 degree-180 degrees and are relatively short in the direction of azimuth angle of 90 degrees-270 degrees denoted by a dotted line in the drawing.

Accordingly, as in the third embodiment, when looking at the light control film 7 in section, a side area of the light diffusing portion 44 in the direction of azimuth angle of 0 degree-180 degrees is smaller than a side area of the light diffusing portion 44 in the direction of azimuth angle of 90 degrees-270 degrees.

Thus, with the light control film 52 of this embodiment, as a whole, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

The directions of the major axes of the plan shapes of the light blocking portions 40 are not required to be all oriented in the direction of azimuth angle of 0 degree-180 degrees. It is just required that, as an average of all the dot shapes of the light blocking portions 40, the directions of the major axes of the light blocking portions 40 perpendicularly intersect the direction of azimuth angle of 90 degrees-270 degrees at a relatively high rate. Furthermore, the dots constituting the light blocking portions 40 may be formed in overlapped relation.

(2) Operation and Effects of Light Control Film

When, for example, the directional backlight 2 having the anisotropic brightness distribution, described above in the first embodiment, is used, as in the third embodiment, in the liquid crystal display device including the light control film 52 of this embodiment, the viewing angle in the direction of azimuth angle of 90 degrees to 270 degrees can be improved as a whole. In particular, since the light control film 52 of this embodiment can increase the amount of light diffused in the direction of azimuth angle of 90 degrees-270 degrees as a whole, a smooth change in the viewing angle can be obtained.

Moreover, when the directional backlight 2 having the isotropic brightness distribution, described in the second embodiment, is used, a smoother continuous change in the viewing angle can be obtained likewise.

Fifth Embodiment

A fifth embodiment of the present invention will be described below with reference to FIGS. 11A and 11B.

A liquid crystal display device of the fifth embodiment has the same basic configuration as that in the first to fourth embodiments, and the fifth embodiment is different from the first to fourth embodiments only in configuration of the light blocking portions in the light control film. For that reason, in the fifth embodiment, description of the basic configuration of the liquid crystal display device is omitted, and only the light control film is described.

Figure 11A:
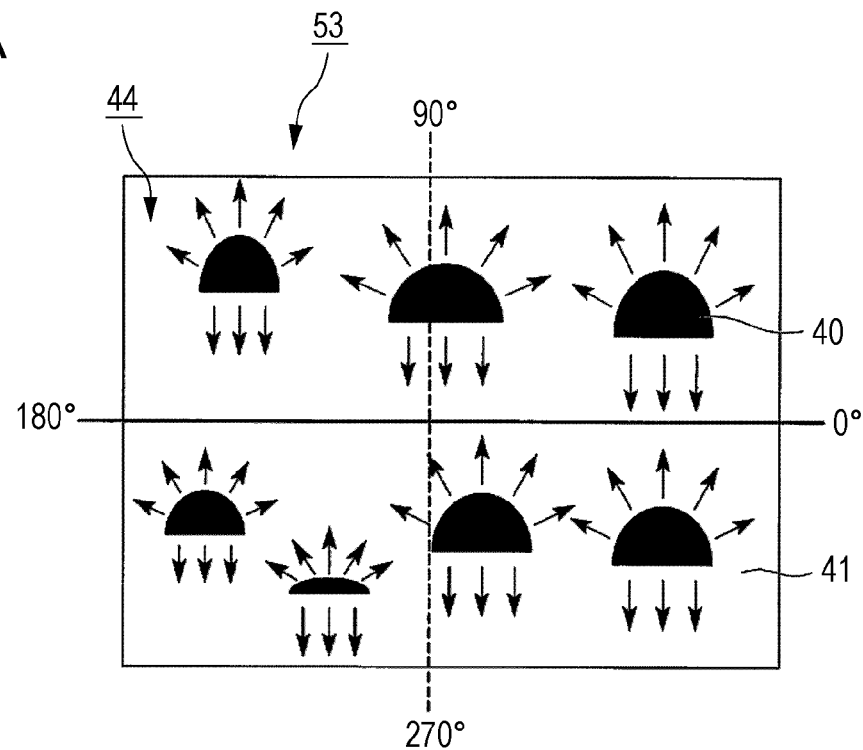
FIG. 11A is an illustration to explain shapes of light blocking portions of a light control film in a liquid crystal display device according to a fifth embodiment.
Figure 11B:
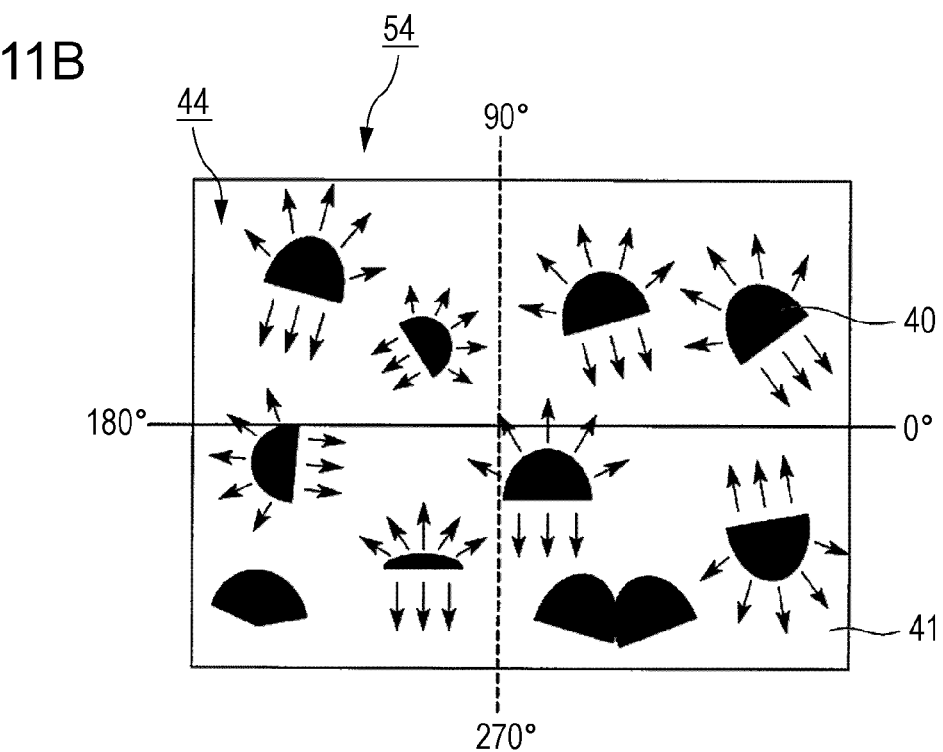
FIG. 11B is an illustration to explain a modification of the light blocking portions of the light control film in the liquid crystal display device according to the fifth embodiment.

Furthermore, in FIGS. 11A and 11B and the following description, common components to those in the drawings referred to in the first to fourth embodiments are denoted by the same reference symbols, and detailed description of those components is omitted.

(1) Structure of Light Control Film

In an optical control film 53 of this embodiment, when looking at the light control film 53 from the z-axis direction, the light blocking portions 40 are arranged to have semicircular dot-like plan shapes as illustrated in FIG. 11A.

Accordingly, with the light control film 53 of this embodiment, as a whole, light is isotropically diffused and output in a relatively small amount in the direction of azimuth angle of 0 degree-180 degrees denoted by a solid line in the drawing, whereas light is diffused and output in a relatively large amount just in the direction of azimuth angle of 270 degrees denoted by a dotted line in the drawing. In other words, asymmetrical light diffusion with higher directivity in the direction of azimuth angle of 270 degrees is realized.

The plan shapes of the light blocking portions 40 are not limited to the semicircular shape, and they may be semi-elliptic, for example, insofar as the dot shape is linear in the direction of azimuth angle of 270 degrees.

(2) Operation and Effects of Light Control Film

When, for example, the directional backlight 2 having the anisotropic brightness distribution, described above in the first embodiment, is used in the liquid crystal display device including the light control film 53 of this embodiment, the viewing angle can be improved in the direction perpendicular to linear portions of the light blocking portions 40, i.e., in the particular direction of azimuth angle of 270 degrees.

Moreover, when the directional backlight 2 having the isotropic brightness distribution, described in the second embodiment, is used, the viewing angle can be similarly improved in the particular direction of azimuth angle of 270 degrees.

(3) Modification

FIG. 11B illustrates a modification of the optical control film according to the fifth embodiment. The modification is different from the fifth embodiment, illustrated in FIG. 11A, in that when looking at a light control film 54 from the z-axis direction, the light blocking portions 40 are formed in semicircular dot-like plan shapes, but the linear portions of the light blocking portions 40 are not all perpendicular to the direction of azimuth angle of 270 degrees. Thus, the linear portions of the light blocking portions 40 are arranged perpendicularly to the direction of azimuth angle of 270 degrees at a relatively large rate as a whole.

Accordingly, with the light control film 54 of this embodiment, as a whole, light is isotropically diffused and output in a relatively small amount in the direction of azimuth angle of 0 degree-180 degrees denoted by a solid line in the drawing, whereas light is diffused and output in a relatively large amount in the direction of azimuth angle of 270 degrees denoted by a dotted line in the drawing. In other words, asymmetrical light diffusion with higher directivity in the direction of azimuth angle of 270 degrees is realized as a whole.

The semicircular plan shape of each light blocking portion 40 may be replaced with a semi-elliptic or sector-like shape. Furthermore, the dot-like shapes of the light blocking portions 40 may be overlapped with each other. Thus, it is just required that, as an average of all the dot shapes of the light blocking portions 40, the directions of the major axes of the light blocking portions 40 perpendicularly intersect the direction of azimuth angle of 270 degrees at a relatively high rate even when, in some of the dot shapes, the linear portions of the light blocking portions 40 extend in the direction of azimuth angle of 90 degrees.

When, for example, the directional backlight 2 having the anisotropic brightness distribution, described above in the first embodiment, is used in the liquid crystal display device including the light control film 54 of the modification of this embodiment, the viewing angle can be improved in the direction of azimuth angle of 270 degrees as a whole. In particular, since the light control film of this embodiment can increase the amount of light diffused in the direction of azimuth angle of 270 degrees as a whole, a smooth change in the viewing angle can be obtained.

Sixth to ninth embodiments of the present invention will be described below with reference to FIGS. 12A to 15. In each of the sixth to ninth embodiments, a liquid crystal display device 1 (display device) also has the same basic configuration as that in the first to fifth embodiments, and the sixth to ninth embodiments are different in configuration of the light blocking portion and the light diffusing portion in the light control film.

More specifically, an optical control film includes a plurality of light diffusing portions formed on one surface side of a base material having optical transparency, and a light blocking portion formed in a remaining region other than regions where the light diffusing portions are formed. In other words, arrangement of the light diffusing portion and the light blocking portion are reversed to that in the light control films according to the first to fifth embodiments.

For that reason, in FIGS. 12A to 15 and the following description, common components to those in the drawings referred to in the first embodiment are denoted by the same reference symbols, and detailed description of those components is omitted.

Sixth Embodiment (1) Structure of Light Control Film

Figure 12A:
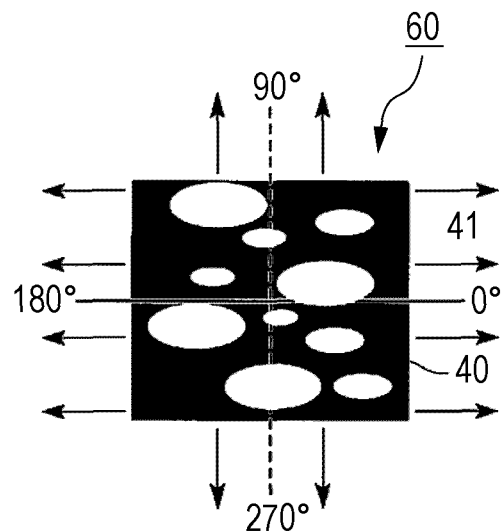
FIG. 12A is an illustration to explain shapes of light diffusing portions of a light control film in a liquid crystal display device according to a sixth embodiment.
Figure 12B:
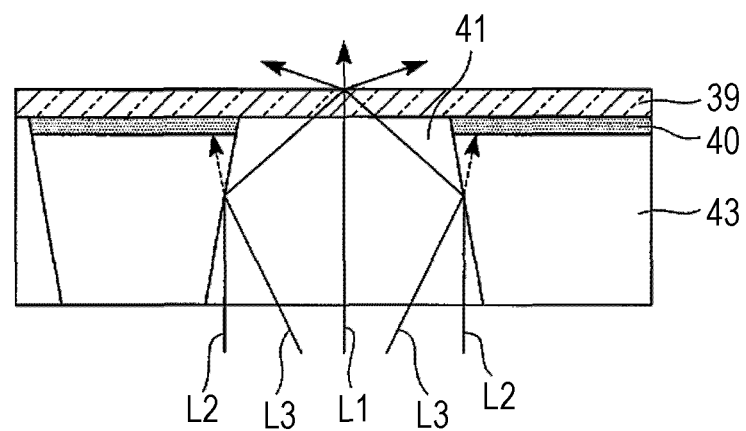
FIG. 12B is an illustration to explain the shapes of the light diffusing portions and reflection of light at lateral surfaces of the light diffusing portions of the light control film in the liquid crystal display device according to the sixth embodiment.
Figure 12C:
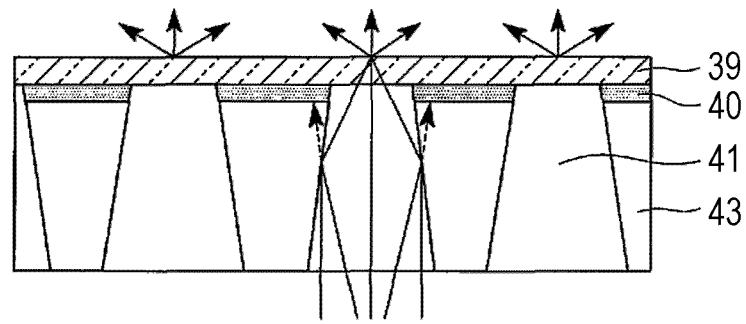
FIG. 12C is an illustration to explain the shapes of the light diffusing portions and reflection of light at the lateral surfaces of the light diffusing portions of the light control film in the liquid crystal display device according to the sixth embodiment.

In a sixth embodiment, as illustrated in FIG. 12A, when looking at a light control film 60 from the z-axis direction, light diffusing portions 44 are arranged to have plan shapes in the form of independent openings each of which is asymmetrical in the up-and-down and right-to-left directions, such as represented by an elliptic shape.

Accordingly, when looking at the light control film 60 in section, a side area (see FIG. 12B) of the light diffusing portions 44 in the direction of azimuth angle of 0 degree-180 degrees denoted by a solid line in FIG. 12A is smaller than a side area (see FIG. 12C) of the light diffusing portions 44 in the direction of azimuth angle of 90 degrees-270 degrees denoted by a dotted line in FIG. 12A. Thus, with the light control film 60 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

The plan shapes of the light diffusing portions 44 may include circular, polygonal, and semicircular shapes. Furthermore, the openings of the light diffusing portions 44 may be formed in overlapped relation.

(2) Operation and Effects of Light Control Film

With the light control film 60 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

On the other hand, when the directional backlight 2 used in this embodiment has such a brightness distribution that brightness increases toward a center from an outer side in the direction of polar angle, and that an amount of output light is smaller in the direction of azimuth angle of 90 degrees-270 degrees than in the direction of azimuth angle of 0 degree-180 degrees, the light is required to be more strongly diffused in the direction of azimuth angle of 90 degrees-270 degrees after having passed through the liquid crystal panel 6 because of relatively high directivity in that direction (see FIGS. 6A and 6B).

In view of the above-mentioned point, a liquid crystal display device with a significant effect of widening the viewing angle in the direction of azimuth angle of 90 degrees to 270 degrees can be realized by combining the direction of azimuth angle of 90 degrees-270 degrees in which the backlight has higher directivity with the direction of azimuth angle of 90 degrees-270 degrees in which the light control film diffuses light more strongly.

Seventh Embodiment (1) Structure of Light Control Film

A seventh embodiment of the present invention will be described below with reference to FIGS. 13A and 13B.

Figure 13A:
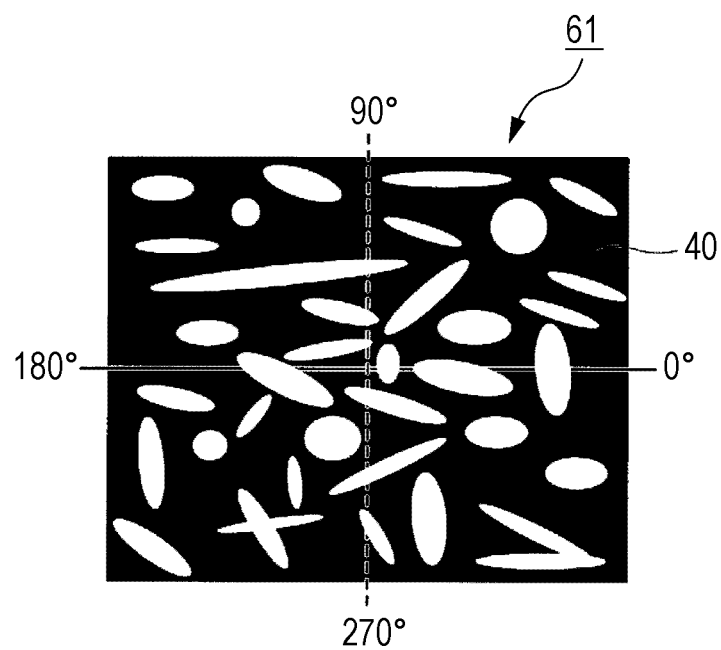
FIG. 13A is an illustration to explain shapes of light diffusing portions of a light control film in a liquid crystal display device according to a seventh embodiment.

In this embodiment, as illustrated in FIG. 13A, when looking at a light control film 61 from the z-axis direction, plan shapes of the light diffusing portions 44 include an isotropic circular shape and dot-like shapes with various anisotropic azimuths, and they are arranged such that an opening of the light diffusing portion 44 is relatively long in the direction of azimuth angle of 0 degree-180 degrees denoted by a solid line in the drawing and is relatively short in the direction of azimuth angle of 90 degrees-270 degrees denoted by a dotted line in the drawing.

Accordingly, when looking at the light control film 61 in section, as in the sixth embodiment, a side area (see FIG. 12B) of the light diffusing portions in the direction of azimuth angle of 0 degree-180 degrees is smaller than a side area (see FIG. 12C) of the light diffusing portions in the direction of azimuth angle of 90 degrees-270 degrees. Thus, with the light control film 61 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

Figure 13B:
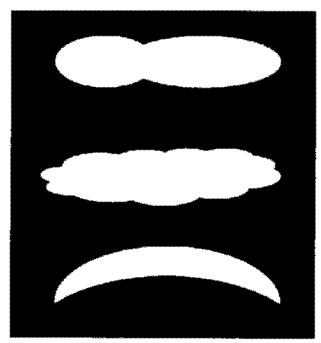
FIG. 13B is an illustration to explain the shapes of the light diffusing portions of the light control film in the liquid crystal display device according to the seventh embodiment.

The opening shape of the light diffusing portion 44 may have undulations or irregularities along its peripheral edge, or may be a crescent shape, as illustrated in FIG. 13B. Furthermore, the openings of the light diffusing portions 44 may be formed in overlapped relation. Thus, the directions of the major axes of the openings are not required to be all oriented in the direction of azimuth angle of 0 degree-180 degrees. In other words, it is just required that the directions of the major axes of the openings perpendicularly intersect the direction of azimuth angle of 90 degrees-270 degrees at a relatively high rate among all the opening shapes. In the case of intensifying the diffusion in the direction of azimuth angle of 90 degrees-270 degrees, the major axes of the openings of the light diffusing portions 44 are preferably arranged in the azimuth angle range of −45 degrees to 45 degrees.

(2) Operation and Effects of Light Control Film

When, for example, the directional backlight 2 having the anisotropic brightness distribution, described above in the first embodiment, is used in the liquid crystal display device including the light control film 61 of this embodiment, the viewing angle in the direction of azimuth angle of 90 degrees to 270 degrees can be improved as a whole. In particular, since the light control film of this embodiment can increase the amount of light diffused in the direction of azimuth angle of 90 degrees-270 degrees as a whole, a smooth change in the viewing angle can be obtained.

Moreover, when the directional backlight 2 having the isotropic brightness distribution, described in the second embodiment, is used, a smoother continuous change in the viewing angle can be obtained.

Eighth Embodiment (1) Structure of Light Control Film

An eighth embodiment of the present invention will be described below with reference to FIG. 14.

Figure 14:
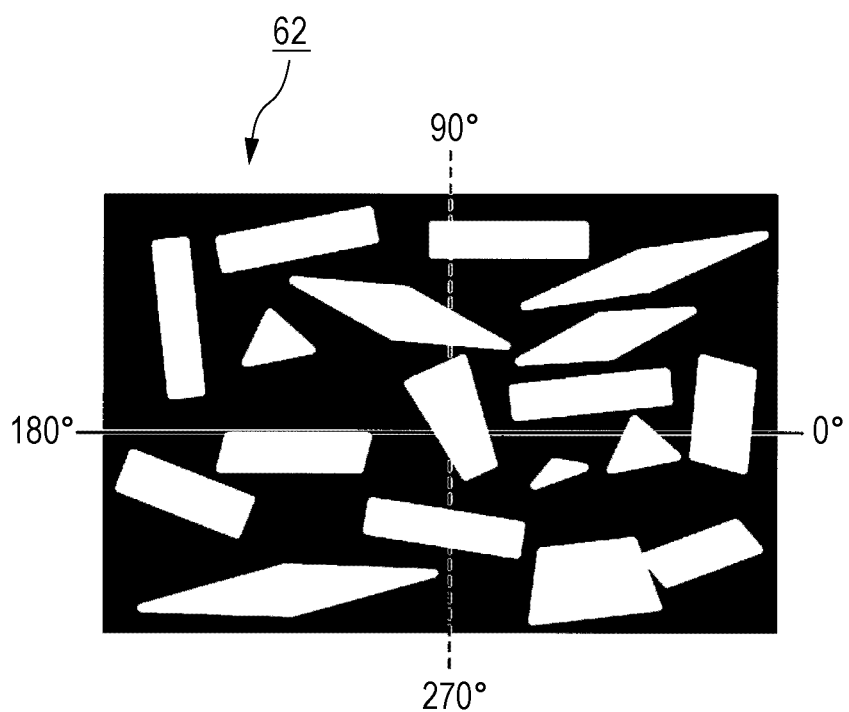
FIG. 14 is an illustration to explain shapes of light diffusing portions of a light control film in a liquid crystal display device according to an eighth embodiment.

In an optical control film 62 of this embodiment, as illustrated in FIG. 14, when looking at the light control film 62 from the z-axis direction, the light diffusing portions 44 are formed as independent openings having polygonal dot-like plan shapes. Furthermore, the individual openings are arranged in a state tilted toward, e.g., the direction of azimuth angle of 0 degree-180 degrees denoted by a solid line in the drawing and in a non-cyclic fashion. Thus, as a whole, the openings are relatively long in the direction of azimuth angle of 0 degree-180 degrees and are relatively short in the direction of azimuth angle of 90 degrees-270 degrees denoted by a dotted line in the drawing.

Accordingly, with the light control film 62 of this embodiment, an amount of light diffused and output in the direction of azimuth angle of 0 degree-180 degrees is relatively small, and an amount of light diffused and output in the direction of azimuth angle of 90 degrees-270 degrees is relatively large. In other words, light diffusion asymmetrical with respect to azimuth is realized.

The openings of the light diffusing portions 44 may be formed in overlapped relation. Furthermore, the directions of the major axes of the openings are not required to be all oriented in the direction of azimuth angle of 0 degree-180 degrees. It is just required that the directions of the major axes of the openings perpendicularly intersect the direction of azimuth angle of 90 degrees-270 degrees at a relatively high rate among all the opening shapes.

(2) Operation and Effects of Light Control Film

When, for example, the directional backlight 2 having the anisotropic brightness distribution, described above in the first embodiment, is used, as in the seventh embodiment, in the liquid crystal display device including the light control film 62 of this embodiment, the viewing angle in the direction of azimuth angle of 90 degrees to 270 degrees can be improved as a whole. In particular, since the light control film 62 of the eighth embodiment can increase the amount of light diffused in the direction of azimuth angle of 90 degrees-270 degrees as a whole, a smooth change in the viewing angle can be obtained.

Moreover, when the directional backlight 2 having the isotropic brightness distribution, described in the second embodiment, is used, a smoother continuous change in the viewing angle can be obtained likewise.

Ninth Embodiment (1) Structure of Light Control Film

A ninth embodiment of the present invention will be described below with reference to FIG. 15.

Figure 15:
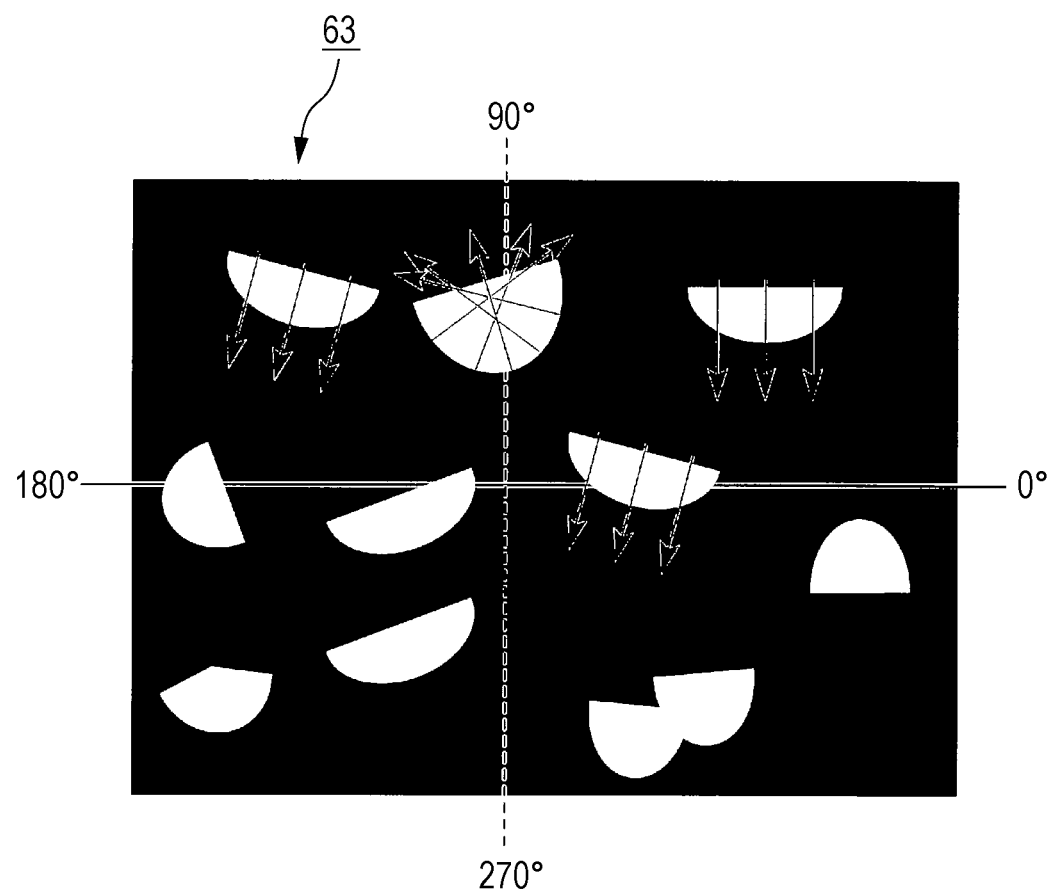
FIG. 15 is an illustration to explain shapes of light diffusing portions of a light control film in a liquid crystal display device according to a ninth embodiment.

In an optical control film 63 of this embodiment, as illustrated in FIG. 15, when looking at the light control film 63 from the z-axis direction, the light diffusing portions 44 are formed as independent openings having semicircular dot-like plan shapes, but linear portions of the openings are not all perpendicular to the direction of azimuth angle of 270 degrees. Thus, the linear portions of the openings are arranged perpendicularly to the direction of azimuth angle of 270 degrees at a relatively large rate as a whole.

Accordingly, with the light control film 63 of this embodiment, as a whole, light is isotropically diffused and output in a relatively small amount in the direction of azimuth angle of 0 degree-180 degrees denoted by a solid line in the drawing, whereas light is diffused and output in a relatively large amount in the direction of azimuth angle of 270 degrees denoted by a dotted line in the drawing. In other words, asymmetrical light diffusion with higher directivity in the direction of azimuth angle of 270 degrees is realized as a whole.

The semicircular plan shape of the opening of each light diffusing portion 44 may be replaced with a semi-elliptic or sector-like shape. Furthermore, the openings may be overlapped with each other. Thus, it is just required that, as an average of all the openings of the light diffusing portions 44, the linear portions of the openings perpendicularly intersect the direction of azimuth angle of 270 degrees at a relatively high rate even when, in some of the dot shapes, the linear portions of the openings extend in the direction of azimuth angle of 90 degrees.

(2) Operation and Effects of Light Control Film

In the optical control film 63 of this embodiment, because of including the openings each made of the linear portion and the circular portion, light diffusion in the azimuth perpendicular to the linear portion is intensified particularly. Therefore, when, for example, the directional backlight 2 having the anisotropic brightness distribution, described above in the first embodiment, is used in the liquid crystal display device including the light control film 63 of this embodiment, the viewing angle can be improved in the direction of azimuth angle of 270 degrees as a whole. In particular, since the light control film of this embodiment can increase the amount of light diffused in the direction of azimuth angle of 270 degrees as a whole, a smooth change in the viewing angle can be obtained.

Figure 16A:
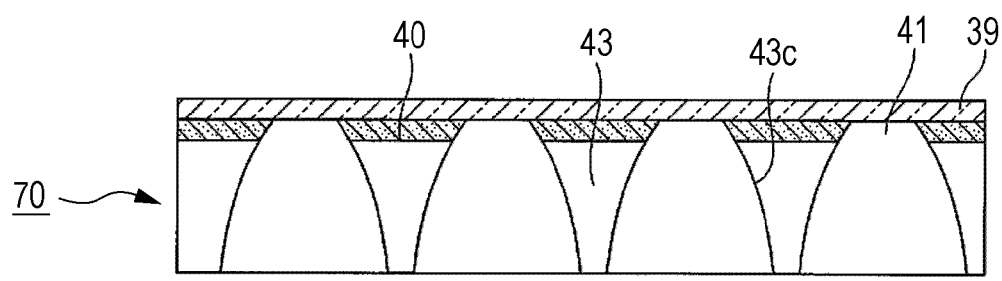
FIG. 16A is a sectional view illustrating a modification of a light diffusing sheet.
Figure 16B:
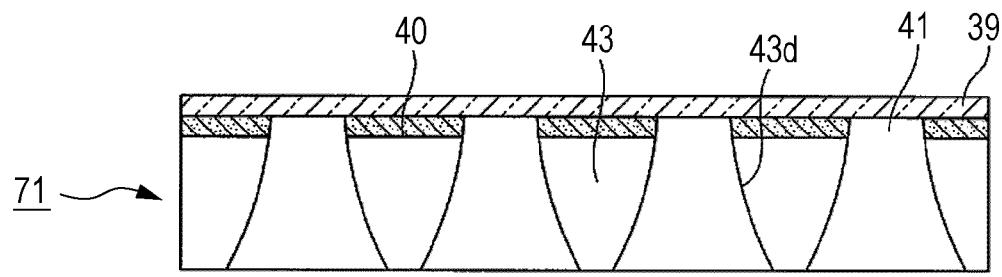
FIG. 16B is a sectional view illustrating a modification of the light diffusing sheet.

While, in the above-described embodiment, the inclination angle of the lateral surface of the light diffusing portion 44 is constant, the inclination angle of the lateral surface of the light diffusing portion 44 may be different depending on positions. In optical control films 70 and 71 illustrated in FIGS. 16A and 16B, for example, the interface between the hollow space 43 and the light diffusing layer 41 (i.e., the lateral surface of the light transmitting portion) may be a slope in curved shape in section, the slope having an inclination angle continuously changed. In the optical control film 70 illustrated in FIG. 16A, an interface 43c between the hollow space 43 and the light diffusing layer 41 is curved in a convex shape toward the hollow space 43, and the hollow space 43 has a concave shape. In the optical control film 71 illustrated in FIG. 16B, an interface 43d between the hollow space 43 and the light diffusing layer 41 is curved in a convex shape toward the light diffusing layer 41, and the hollow space 43 has a convex shape. The above-described configurations can also increase light diffusibility.

Figure 17A:
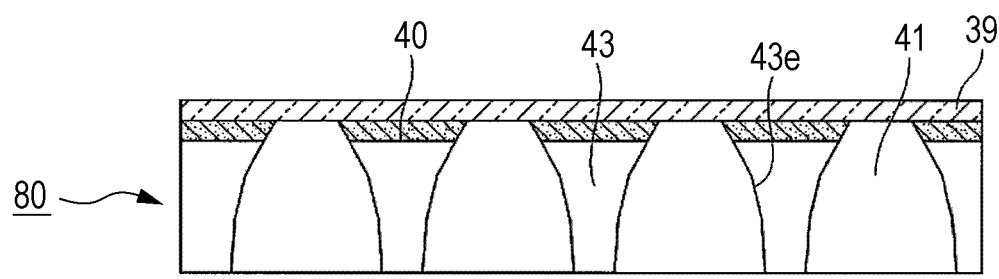
FIG. 17A is a sectional view illustrating another modification of the light diffusing sheet.
Figure 17B:
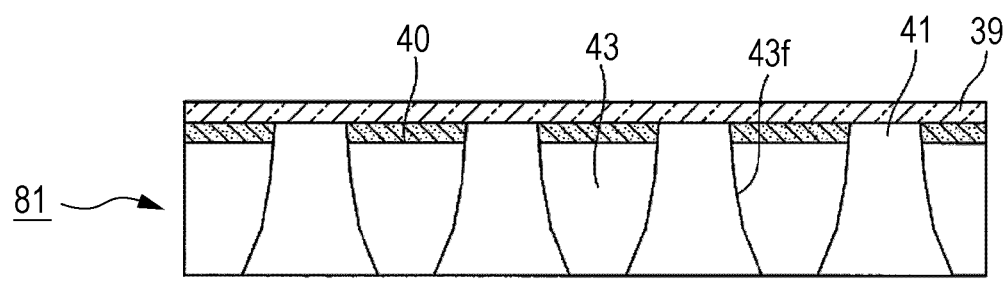
FIG. 17B is a sectional view illustrating still another modification of a light diffusing sheet.

Alternatively, in optical control films 80 and 81 illustrated in FIGS. 17A and 17B, for example, the interface between the hollow space 43 and the light diffusing layer 41 (i.e., the lateral surface of the light transmitting portion) may be a slope in a kinked-line shape in section, the slope having a plurality of inclination angles different from each other. In the optical control film 80 illustrated in FIG. 17A, an interface 43e between the hollow space 43 and the light diffusing layer 41 includes three slopes having different inclination angles, and the hollow space 43 has a concave shape. In the optical control film 81 illustrated in FIG. 17B, an interface 43f between the hollow space 43 and the light diffusing layer 41 includes three slopes having different inclination angles, and the hollow space 43 has a convex shape. The above-described configurations can also increase light diffusibility.

In addition, at least one of an anti-reflection layer, a polarization filter, an antistatic layer, an antiglare layer, and an antifouling layer may be disposed on the viewing side of the transparent base material of the optical control film according to any of the above-described embodiments. With such an arrangement, the optical control film can be given with the function of reducing reflection of outside light, the function of preventing attachment of dust and foul, the function of preventing flaws, etc. depending on the type of the layer that is disposed on the viewing side of the base material. It is hence possible to prevent degradation of a viewing angle characteristic with the lapse of time.

INDUSTRIAL APPLICABILITY

The present invention can be applied to various types of display devices, such as a liquid crystal display device, an organic electroluminescence display device, a plasma display, an LED display, and a MEMS display.

REFERENCE SIGNS LIST

1 . . . liquid crystal display device (display device), 6 . . . liquid crystal panel (display body), 7, 50, 51, 52, 53, 54, 60, 61, 62, 63, 70, 71, 80, 81 . . . optical control film (light diffusing member, viewing-angle widening member), 39 . . . transparent base material, 40 . . . light blocking portions, 41 . . . light diffusing portion (light transmissive material layer), 43 . . . hollow space, and 44, 44a, 44b, 44c, 44d . . . light diffusing portion.

The invention claimed is:

1. A liquid crystal display device comprising:
a light source;
a liquid crystal panel that modulates light emitted from the light source; and
an optical control film that is arranged on a first side closer to a viewing person than the liquid crystal panel, and that utilizes total reflection,
wherein the optical control film includes a transparent base material, a plurality of light blocking layers, and a light diffusing portion, the plurality of light blocking layers being provided in a random and non-cyclic arrangement on a first region of one surface of the transparent base material, the light diffusing portion being provided on a second region of the one surface, the first region being different from the second region, a film thickness of the light diffusing portion is larger than a thickness of the plurality of light blocking layers, the light diffusing portion includes a light output end surface on a second side closer to the transparent base material and a light input end surface on a third side opposite to the transparent base material, the light input end surface having a larger area than the light output end surface, the optical control film including a lower refractive-index material that has a lower refractive index than the light diffusing portion, and that is present in a cavity defined by the light diffusing portion, the optical control film anisotropically diffusing light, the lower refractive-index material being air or inert gas, the light diffusing portion includes an opening at the light input end surface, the opening being opposite to the plurality of light blocking layers, the opening having a smaller area than the plurality of light blocking layers, and shapes of the plurality of light blocking layers when viewed in plan from a direction normal to the one surface of the transparent base material include an isotropic shape and an anisotropic shape, the anisotropic shape having a long axis and a short axis.

2. An optical control film comprising:

a base material having optical transparency;

a plurality of light blocking portions provided, in a random and non-cyclic arrangement, on one surface of the base material in a scattered state; and a light diffusing portion continuously provided on the one surface of the base material in a remaining region other than regions where the light blocking portions are provided, wherein a film thickness of the light diffusing portion is larger than a thickness of each of the plurality of light blocking portions, the light diffusing portion includes a light output end surface on a first side closer to the base material and a light input end surface on a second side opposite to the base material, the light input end surface having a larger area than the light output end surface, the light diffusing portion is continuous with the one surface of the base material at the light output end surface, the light diffusing portion includes an opening at the light input end surface, the opening being opposite to one of the plurality of light blocking portions, the opening having a smaller area than the one of the plurality of light blocking portions, a lower refractive-index material having a lower refractive index than the light diffusing portion is present in a cavity defined in the light diffusing portion, the lower refractive-index material being air or inert gas, and shapes of the plurality of light blocking portions when viewed in plan from a direction normal to the one surface of the base material include an isotropic shape and an anisotropic shape, the anisotropic shape having a long axis and a short axis.

3. The optical control film according to claim 2, wherein a plan shape of the plurality of light blocking portions when viewed from a direction normal to the one surface of the base material includes an isotropic shape and an anisotropic shape together.

4. The optical control film according to claim 2, wherein a plan shape of the plurality of light blocking portions when viewed from a direction normal to the one surface of the base material is a shape including a curved line and a linear line.

5. The optical control film according to claim 2, wherein an optical diffusion layer including a light scatterer is disposed on one surface closer to viewing side than the light diffusing portion.

6. The optical control film according to claim 2, wherein the plurality of light blocking portions are made of a multilayered film including a black resin that contains at least one of light-absorbing pigment, light-absorbing dye and carbon black, a metal, or a metal oxide.

7. The optical control film according to claim 2, wherein an interface between the cavity defined by the light diffusing portion and the light diffusing portion is a slope in a curved shape in section, the slope having an inclination angle continuously changed.

8. The optical control film according to claim 2, wherein an interface between the cavity defined by the light diffusing portion and the light diffusing portion is a slope in a kinked-line shape in section, the slope having a plurality of inclination angles different from each other.

9. A display device employing the optical control film according to claim 2.

10. A liquid crystal display device employing the optical control film according to claim 2.

11. An optical control film comprising:

a base material having optical transparency;

a plurality of light diffusing portions provided on one surface of the base material; and a plurality of light blocking layers provided, in a random and non-cyclic arrangement, on the one surface of the base material in a remaining region other than regions where the plurality of light diffusing portions are formed, wherein a film thickness of each of the plurality of light diffusing portions is larger than a thickness of the plurality of light blocking layers, each of the plurality of light diffusing portions includes a light output end surface on first side closer to the base material and a light input end surface on a second side opposite to the base material, the light input end surface having a larger area than the light output end surface, the plurality of light diffusing portions include an opening at the light input end surface, the opening being opposite to the plurality of light blocking layers, the opening having a smaller area than the plurality of light blocking layers, a lower refractive-index material having a lower refractive index than the plurality of light diffusing portions is present in a cavity defined between the plurality of light diffusing portions, the lower refractive-index material being air or inert gas, and shapes of the plurality of light blocking portions when viewed in plan from a direction normal to the one surface of the base material include an isotropic shape and an anisotropic shape, the anisotropic shape having a long axis and a short axis.

12. The optical control film according to claim 11, wherein a plan shape of the plurality of light diffusing portions when viewed from a direction normal to the one surface of the base material is an anisotropic shape having at least a long axis and a short axis.

13. The optical control film according to claim 11, wherein a plan shape of the plurality of light diffusing portions when viewed from a direction normal to the one surface of the base material includes an isotropic shape and an anisotropic shape together.

14. The optical control film according to claim 11, wherein a plan shape of the plurality of light diffusing portions when viewed from a direction normal to the one surface of the base material is polygonal.

15. The optical control film according to claim 11, wherein a plan shape of the plurality of light diffusing portions when viewed from a direction normal to the one surface of the base material is a shape including a curved line and a linear line.

* * * * *